US008703083B2

(12) United States Patent
Solovyov et al.

(10) Patent No.: US 8,703,083 B2
(45) Date of Patent: Apr. 22, 2014

(54) BIFUNCTIONAL ACTIVE SITES FOR ADSORPTION OF NOX

(75) Inventors: Andrew Solovyov, Berkeley, CA (US); Alexander Katz, Kensington, CA (US); Enrique Iglesia, Morage, CA (US); Paul Timothy Fanson, Brighton, MI (US)

(73) Assignees: The Regents of the University of California, Oakland, CA (US); Toyota Motor Engineering & Manufacturing North America, Inc., Erlanger, KY (US)

( * ) Notice: Subject to any disclaimer, the term of this patent is extended or adjusted under 35 U.S.C. 154(b) by 456 days.

(21) Appl. No.: 12/510,861

(22) Filed: Jul. 28, 2009

(65) Prior Publication Data

US 2009/0308252 A1    Dec. 17, 2009

Related U.S. Application Data

(63) Continuation of application No. 12/030,200, filed on Feb. 12, 2008.

(60) Provisional application No. 60/900,822, filed on Feb. 12, 2007, provisional application No. 60/939,839, filed on May 23, 2007.

(51) Int. Cl.
*B01D 53/56* (2006.01)
*B01D 53/86* (2006.01)
*B01J 8/00* (2006.01)
*C01B 21/00* (2006.01)

(52) U.S. Cl.
USPC ......... 423/239.1; 423/235; 131/334; 131/331

(58) Field of Classification Search
USPC ............... 423/235, 351, 385, 239.1; 502/167; 131/334, 336, 342, 344; 548/300.1, 548/316.7, 354.1, 347.1
See application file for complete search history.

(56) References Cited

U.S. PATENT DOCUMENTS

| 3,708,553 A | 1/1973 | Olah |
| 4,163,452 A | 8/1979 | Green et al. |

(Continued)

FOREIGN PATENT DOCUMENTS

| GB | 1592157 | 7/1981 |
| JP | 09-047628 | 2/1997 |

(Continued)

OTHER PUBLICATIONS

"Determination of NO and NO2 in Cigarette Smoke From Kinetic Data" published in Tobacco Science 13, 180-182 (1969) by Sloan et al.*

(Continued)

*Primary Examiner* — Basia Ridley
*Assistant Examiner* — Heng Chan
(74) *Attorney, Agent, or Firm* — Morgan, Lewis & Bockius LLP; Jeffry S. Mann; Ada O. Wong

(57) ABSTRACT

Immobilized nitronyl nitroxide active sites on the surface of a porous inorganic oxide support act as efficient and rapid oxidants for NO, reacting with >99% of the NO under flow conditions through a packed bed; and, in a parallel configuration with nitroxyl radical active sites, act to remove >99 % of both NO and $NO_2$ from a gas mixture, with >95% of the active sites participating in $NO_x$ trapping.

19 Claims, 8 Drawing Sheets

(56) References Cited

U.S. PATENT DOCUMENTS

| | | |
|---|---|---|
| 2003/0106562 A1 | 6/2003 | Chatterjee |
| 2004/0042939 A1 | 3/2004 | Rajaram et al. |
| 2005/0158611 A1* | 7/2005 | Sugimasa et al. ............... 429/40 |
| 2005/0247049 A1 | 11/2005 | Kaboord et al. |
| 2005/0256169 A1 | 11/2005 | Holmes et al. |

FOREIGN PATENT DOCUMENTS

| | | |
|---|---|---|
| JP | 11-192436 | 7/1999 |
| JP | 2004516400 A | 6/2004 |

OTHER PUBLICATIONS

Chou, S. et al., "Oxidation and Mass Spectra of 4,4-Dimethyloxaolidine-N-oxyl (Doxyl) Derivatives of Ketones", *J. Org. Chem.*, (1974) vol. 39, pp. 2356-2361.

Damiani, E. et al., "Reaction of indolinonic aminoxyls with nitric oxide", *J. Chem. Soc.*, Perkin-Trans II (2001), pp. 1139-1144.

Davies, C.A. et al., "Characterization of the Radical Product Formed from the Reaction of Nitric Oxide with the Spin Trap 3,5-Dibromo-4-Nitrosobenzene Sulfonate", *Nitric Oxide: Biology and Chemistry* (2001), pp. 116-127.

Epling et al., "Overview of the Fundamental Reactions and Degradation Mechanisms of NOx Storage/Reduction Catalysts", *Catalysis Reviews*, (2004) 46(2): pp. 163-245.

Goldstein, S. et al., "Reaction of Cyclic Nitroxides with Nitrogen Dioxide: The Intermediacy of the Oxoammonium Cations", *J. Am. Chem. Soc.*, (2003) vol. 125, pp. 8364-8370.

Goldstein, S. et al., "Reactions of PTIO and Carboxy-PTIO with NO, NO2, and O2", *Journal of Biological Chemistry*, (2003) vol. 278, No. 51, pp. 50949-50952.

Hirel, C. et al., "Nitronyl and Imino Nitroxides: Improvement of Ullman's Procedure and Report on a New Efficient Synthetic Route", *Chem. Eur. J.*, (2001) vol. 7, pp. 2007-2014.

Kaupp, G. et al., "Gas/Solid Reactions with Nitrogen Dioxide", *J. Org. Chem.*, (1995) vol. 60, pp. 5494-5503.

Ma, Z. et al., "Oxoammonium Salts. 5. A New Synthesis of Hindered Piperidines Leading to Unsymmetrical TEMPO-Type Nitroxides. Synthesis and Enantioselective Oxidations with Chiral Nitroxides and Chiral Oxoammonium Salts", *J. Org. Chem.*, (1993) vol. 58, pp. 4837-4843.

Nadeau, J.S. et al., "Stable Free Radical Reagent and Solid Phase Suitable for a Nitric Oxide Dosimeter", Analytical Chemistry, (1977) vol. 49, pp. 1672-1676.

Nadeau, J.S. et al., "Mass Transfer Effects in a Nitric Oxide Dosimeter", *Analytical Chemistry* (1978) vol. 50, pp. 1871-1873.

Takaaki, A. et al., "Antagonistic Action of Imidazolineoxyl N-Oxides against Endothelium-Derived Relaxing Factor / NO through a Radical Reaction", *Biochemistry*, (1993) vol. 32, pp. 827-832.

Wu, Y. et al., "Novel 2-substituted nitronyl nitroxides as free radical scavengers: Synthsis, biological evaluation and structure-activity relationship", *Bioorg. Med. Chem.*, (2006) vol. 14, pp. 5711-5720.

* cited by examiner

BIFUNCTIONAL ACTIVE SITES FOR ADSORPTION OF NOX

CROSS-REFERENCE TO RELATED APPLICATIONS

This application is a continuation of U.S. Ser. No. 12/030,200 filed Feb. 12, 2008 which claims priority under 35 U.S.C. §119(e) from U.S. Provisional application No. 60/900,822 filed Feb. 12, 2007, and U.S. Provisional Application No. 60/939,839 filed May 23, 2007, the disclosures of which are incorporated herein by reference in their entireties for all purposes.

BACKGROUND OF THE INVENTION

Increased awareness of the detrimental health consequences of NOx as well as tighter legislation have required improved adsorption and trapping systems for NOx.[1] This invention concerns improvements relating to NOx traps or materials for the specific adsorption of nitric oxide (NO) and nitrogen dioxide ($NO_2$) components in a gas mixture. Such systems are typically used in harm reduction for situations involving combustion processes, such as those that result in tobacco smoke. While gases arising from combustion processes can contain many components such as aldehydes, cyanides, sulphides and oxide, it is difficult to remove NOx, and especially NO, due to intrinsically low reactivity. A desirable characteristic of a NOx adsorbent is that it removes virtually all NOx present in a gas mixture with rapid kinetics. An additional desirable trait is that it functions at low temperatures—including room temperature and below. A furthermore desirable trait of such an adsorbent material is that it be tolerant to other molecules, particularly sulfur and sulfides, which are both known to act as poisons for metal-based NOx adsorption and catalysis sites.

In the field of tobacco-smoke filter technology, one of the major technological problems is the reduction of NO, which has been implicated to have a role in lung damage and a variety of diseases in smokers, including chronic obstructive pulmonary disease and emphysema.[1,5] A desirable trait of a tobacco smoke filter is an active site (e.g., the oNO oxidation site) being essentially metal free or wholly organic.

A different strategy for trapping NOx molecules that has shown recent promise is the use of hybrid organic-inorganic materials. This proposal addresses the development of novel materials capable of detecting or trapping NO and $NO_2$ via selective adsorption on specific organic binding sites. These sites consist of immobilized molecular receptors on silica platforms, which interact with NO and $NO_2$ at low concentrations in gas and liquid phases.

Recent attention has focused on using organic functional groups, and specifically organic radicals, as active sites for NOx adsorption. $NO_2$ is known to react with nitroxyl radical sites to synthesize an oxoammonium cation via reactions shown below.[2,3,4] Two $NO_2$ molecules are removed from the gas phase per nitroxyl radical site: one due to nitrite salt formation, and the other for nitrite oxidation to nitrate, which consumes $NO_2$ as oxidant and forms NO in the gas phase as a by-product. The resulting oxoammonium nitrate salt is known to be non-hygroscopic, and thermally, mechanically, and oxidatively stable.[3]

Nitroxyl radicals have been immobilized onto polymers and high surface area porous materials in the prior art in order to remove NOx from a gas mixture; however, only a fraction of NO can be removed from a gas mixture with these materials, typically less than 72%.[5]

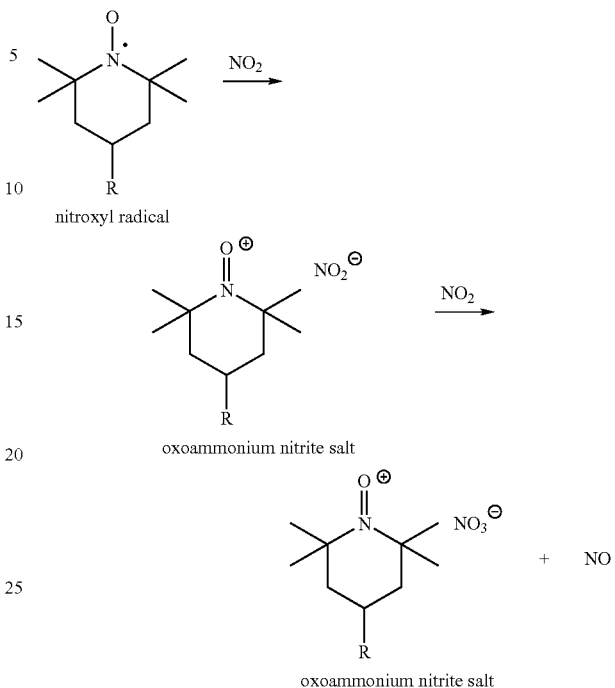

Scheme 1. Sequential reaction of nitroxyl radical site with $NO_2$.

nitroxyl radical oxoammonium nitrite salt oxoammonium nitrite salt

Nitronyl nitroxides are known to act as an oxidant in reacting with NO to form $NO_2$.[6] Materials consisting of physisorbed, non-covalently immobilized nitronyl nitroxides on the surface of silica have been used to previously convert NO to $NO_2$.[7] A significant limitation when using such materials is the very slow kinetics of NO oxidation, indeed too slow to be useful in a practical application, as it typically occurs over time scales of several hours at low NO concentration.[7] It would be a distinct advantage to synthesize an immobilized nitronyl nitroxide-containing site that could react with NO almost instantaneously and at the limit of mass transport in bulk or mesoporous channels—typically involving fractions of a second for typical particle sizes.

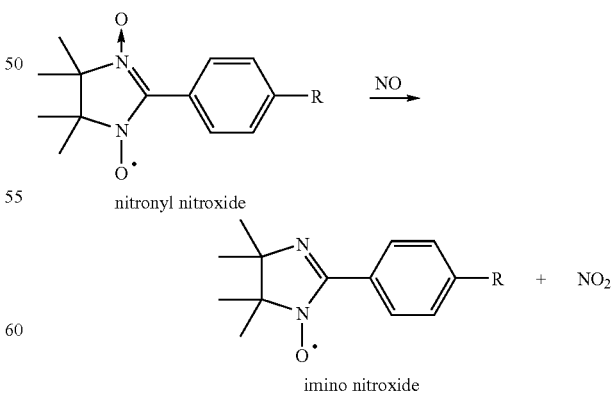

Scheme 2. Oxidation of NO using a nitronyl nitroxide active site.

nitronyl nitroxide imino nitroxide

A material that incorporated organic sites for adsorption or oxidation of NO, and/or organic sites for adsorption or reduction of $NO_2$ (e.g., essentially simultaneous oxidation of NO and storage of $NO_2$) would represent a significant advance in the art. Quite surprisingly, the present invention provides such materials.

BRIEF SUMMARY OF THE INVENTION

The present invention provides materials that incorporate one or more organic sites for adsorption, reduction or oxidation of an NOx species. A generally preferred active site is an organic site, thereby avoiding the toxicological problems inherent with metals. The organic site is generally immobilized on a substrate, which may be an organic polymer or inorganic material. The immobilization can be through covalent attachment of the organic site to the substrate, optionally through a linker or the organic site can be immobilized through a non-covalent interaction with the substrate (e.g., chemisorption, physisorption, host-guest, etc.). Exemplary organic sites include radicals, e.g., nitroxide radicals. The invention further provides systems and devices that incorporate one or more material of the invention and methods of using the materials, systems, devices and methods of the invention. Preferred materials of the invention are active for NOx storage at low temperatures, e.g., less than 200° C. An additional advantage provided by materials of the present invention is sulfur tolerance, due to the fact that preferred organic NO oxidation and $NO_2$ adsorption sites are sulfur-resistant organic radicals, which is another advantage over conventional inorganic-type active sites for this purpose, since these are typically deactivated by the presence of sulfur ($SO_x$ species).

In one aspect, the present invention provides a robust material for the selective adsorption of NO and $NO_2$ in a gas mixture, which is i) essentially unaffected by the presence of one or more of CO, $CO_2$, $O_2$, and $H_2O$, ii) offers acceptable tolerance to the presence of $SO_x$, and iii) has an active site efficiency that is greater than 80%, preferably greater than 85%, more preferably greater than 90% and still more preferably greater than 95% (this fraction of active sites are actually actively participating in the function of the adsorption system), and iv) is optionally a recyclable and reusable NOx storage system. Preferred materials can be regenerated via release of $NO_x$ with a trigger (e.g., light, chemical, or heat), permitting recyclability.

Underlying the functionality of the materials of one aspect of the invention is the combination, in a parallel or near-parallel configuration, of NO oxidation sites with $NO_2$ adsorption sites, wherein at least one of the types of sites is an organic radical and wherein the NO oxidation site can be either stoichiometric or catalytic. Such a configuration can be achieved by immobilizing each type of site on the same material or, alternatively, by mechanically mixing two materials, each of which consists of immobilized versions of one of the types of sites. The resulting materials remove NO and/or $NO_2$ from a gas or other fluid phase.

In contrast to prior systems, the present invention provides an efficient system for the oxidation of NO to $NO_x$, and trapping of the $NO_x$ produced. Referring to FIG. 2 of Boocock et al. (Anal. Chem., 49, 1977, p. 1674), the timescale of reaction of NO in an inert gas stream with PTIO immobilized non-covalently on silica gel was on the timescale of 12 hours. The materials in the present invention in which the NO reactive site is non-covalently bound react with NO much faster than this timescale. We are in a position to say with certainty that the slower timescale in the prior art may not be due solely to clumping of physisorbed species on silica as presumed previously to be the case. The slower timescale may also be the result of: i) a lower NO concentration of 0.66 ppm instead of our higher concentration of 2000 ppm, ii) degradation of nitronyl nitroxide sites by reaction with the $NO_2$ synthesized from NO. Effect (i) is unlikely to solely be responsible for the difference because assuming linear dependence of rate on NO concentration—it would mean that for our system we would have a predicted response time of more than 14 seconds—much slower than the ostensibly immediate response we observe. Effect (ii) is likely a factor because the $NO_2$ trap consumes $NO_2$ from the gas phase before it can degrade nitronyl nitroxide active sites. This degradation of nitronyl nitroxide sites is supported by data in more recent publications (see, e.g., J. Biol. Chem., 278, (51), 2003, pp 50949-50955), which show that $NO_2$ degrades nitronyl nitroxides to oxoammonium cations via chemical (side)reaction.

Prior references do not disclose the use of nitronyl nitroxide with $NO_2$ trap active sites in a parallel configuration. The latter has advantages in attaining theoretical yield of NO consumed per nitronyl nitroxide reacted, which is impossible to achieve without a $NO_2$ trap in a parallel configuration, as demonstrated in the examples, and may partly explain the fast response times over the prior art. Specifically, the high efficiencies of silica-anchored nitronyl nitroxide active sites in oxidizing NO to $NO_2$ are the result of using an $NO_2$ trap in a parallel configuration, which prevents the $NO_2$ product to inhibit other nitronyl nitroxide active sites because of rapid $NO_2$ removal from the gas stream.

An exemplary two-site material of the invention is a nitronyl nitroxide-based active NO oxidation site and an organic radical $NO_2$ storage site. An exemplary $NO_2$ adsorption site is an organic radical, e.g., a nitroxide radical (e.g., TEMPO) site, although more commonly recognized adsorption sites are of use in the materials and methods of the invention as well. See, for example, Epling et al., *Catalysis Reviews* 46(2): 163-245 (2004).

Another strategy for trapping NOx molecules with materials of the present invention is the use of hybrid organic-inorganic materials. The present invention provides novel materials capable of detecting or trapping NO and $NO_2$ via selective adsorption on specific organic binding sites. These sites consist of immobilized molecular receptors on organic (e.g., polymeric) or inorganic (e.g., silica, alumina, zeolite) platforms, which interact with NO and $NO_2$ in gas and liquid phases. Presently preferred hybrid materials have an efficiency of at least 80%, meaning that at least 80% of the binding sites are occupied with storing either NO or $NO_2$ by interacting with these species.

Exemplary approaches set forth herein share the common trait of involving radical-based molecular receptors or interactions with either NO or $NO_2$. Exemplary materials provide reversible binding and release of NO and $NO_2$ within functional materials that rely on one or both of covalent and non-covalent adsorption mechanisms, with the eventual goal of permitting reusability of the material for NOx storage and release.

In other exemplary embodiments, the radicals utilized to bind NO and $NO_2$ include immobilized calixarene cation radicals for NO adsorption. Calixarene quinones as are able to achieve yields of calixarene cation radicals for NO adsorption while also retaining oxidative stability.

In still further exemplary embodiments, the materials of the invention include immobilized thiyl radicals for NO adsorption.

An exemplary nitroxide-based material includes a covalently anchored TEMPO on silica system for robust adsorption of $NO_2$, which functions according to the reaction sequence below:

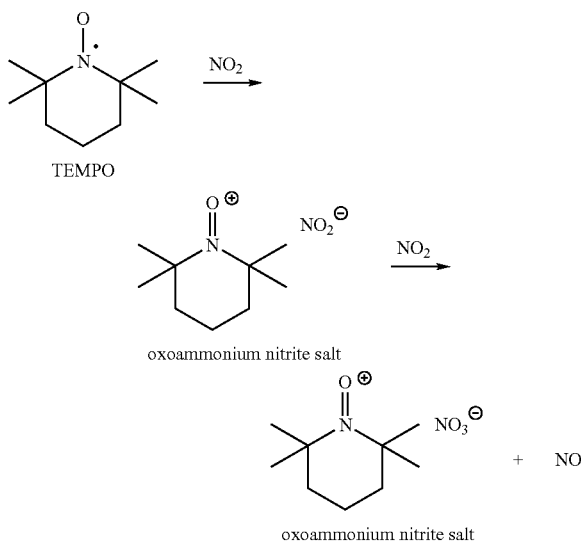

In another embodiment, the invention provides a device that includes (a) a system of the invention and (b) a container for said system, wherein said container comprises a gas inlet port and a gas outlet port. In an exemplary embodiment, the device is communicates with a source of gas that includes NO. The source of gas at the device inlet is more enriched in NO content than the gas at the device outlet.

Also provided is a method of oxidizing NO to $NO_2$. In some exemplary embodiments, the method includes contacting NO with a nitronyl nitroxide under conditions appropriate to oxidize NO to $NO_2$, thereby oxidizing NO to $NO_x$, while storing oxidized NO (e.g., $NO_2$) in a trap (e.g., a trap arranged in a parallel configuration with the active oxidation site). The nitronyl nitroxide is preferably covalently attached to a solid support. In still further embodiments, the method includes contacting NO with oxoammonium nitrite or oxoammonium nitrate under conditions appropriate to oxidize NO to $NO_2$, thereby oxidizing NO to $NO_x$, while storing oxidized NO (e.g., $NO_2$) in a trap (e.g., a trap arranged in a parallel configuration with the active oxidation site).

Other aspects, objects and advantages of the present invention will be apparent from the detailed description that follows.

DETAILED DESCRIPTION OF THE INVENTION

Definitions

Figure 1:
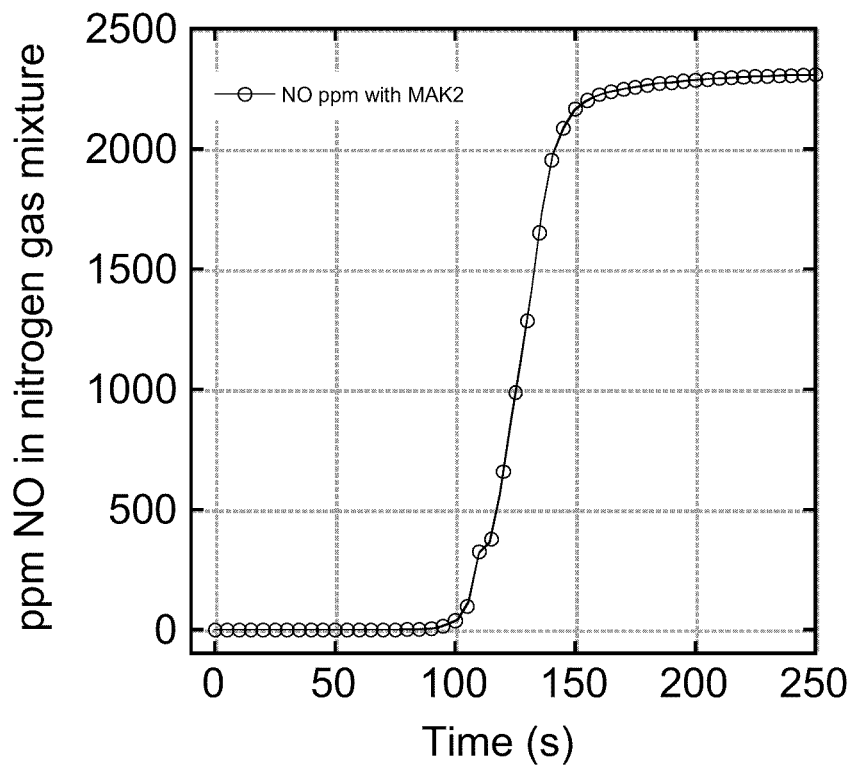
FIG. 1. Amount of NO exiting reactor as a function of time on stream during treatment of material MAK2 with NO in $N_2$ gas mixture.

Unless defined otherwise, all technical and scientific terms used herein generally have the same meaning as commonly understood by one of ordinary skill in the art to which this invention belongs. The techniques and procedures are generally performed according to conventional methods in the art and various general references, which are provided throughout this document. The nomenclature used herein and the laboratory procedures in analytical chemistry, and organic synthetic described below are those well known and commonly employed in the art. Standard techniques, or modifications thereof, are used for chemical syntheses and chemical analyses.

The terms "host" and "molecular host" refer, essentially interchangeably, to a molecule that surrounds or partially surrounds and attractively interacts with a molecular "guest." When the "host" and "guest" interact the resulting species is referred to herein as a "complex." An exemplary host of use in the materials of the invention include those hosts complexing NO or $NO_2$, e.g., a calixarene.

Where substituent groups are specified by their conventional chemical formulae, written from left to right, they equally encompass the chemically identical substituents which would result from writing the structure from right to left, e.g., —$CH_2O$— is intended to also recite —$OCH_2$—; —$NHS(O)_2$— is also intended to represent. —$S(O)_2HN$—, etc.

The term "alkyl," by itself or as part of another substituent, means, unless otherwise stated, a straight or branched chain, or cyclic hydrocarbon radical, or combination thereof, which may be fully saturated, mono- or polyunsaturated and can include di- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. This term includes alkenyl and alkynyl moieties. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl." Alkyl groups, which are limited to hydrocarbon groups are termed "homoalkyl".

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—$CH_2$, —S(O)—$CH_3$, —$CH_2$—$CH_2$—S(O)$_2$—$CH_3$, —CH=CH—O—$CH_3$, —Si($CH_3$)$_3$, —$CH_2$—CH=N—$OCH_3$, and —CH=CH—N($CH_3$)—$CH_3$. Up to two heteroatoms may be consecutive, such as, for example, —$CH_2$—NH—$OCH_3$ and —$CH_2$—O—Si($CH_3$)$_3$. Similarly, the term "heteroalkylene" by itself or as part of another substituent means a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —C(O)$_2$R'— represents both —C(O)$_2$R'— and —R'C(O)$_2$—.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) can be one or more of a variety of groups selected from, but not limited to: —OR', =O, =NR', =N—OR', —NR'R", —SR', -halogen, —SiR'R"R''', —OC(O)R', —C(O)R', —CO$_2$R', —CONR'R", —OC(O)NR'R", —NR"C(O)R', —NR'—C(O)NR"R''', —NR"C(O)$_2$R', —NR—C(NR'R"R''')=NR'''', —NR—C(NR'R")=NR''', —S(O)R', —S(O)$_2$R', —S(O)$_2$NR'R", —NRSO$_2$R', —CN and —NO$_2$ in a number ranging from zero to (2m'+1), where m' is the total number of carbon atoms in such radical. R', R", R''' and R'''' each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R''' and R'''' groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —$CF_3$ and —$CH_2CF_3$) and acyl (e.g., —C(O)$CH_3$, —C(O)$CF_3$, —C(O)$CH_2OCH_3$, and the like).

Each of the above terms is meant to include both substituted and unsubstituted forms of the indicated radical.

As used herein, the term "heteroatom" is meant to include oxygen (O), nitrogen (N), sulfur (S) and silicon (Si).

"Binding functionality" as used herein means a moiety, which has an affinity for a certain substance such as a "substance to be assayed," that is, a moiety capable of interacting with a specific substance to immobilize it on an adsorbent material of the invention. Binding functionalities can be chromatographic or analyte specific. Chromatographic binding functionalities bind substances via charge-charge, hydrophilic-hydrophilic, hydrophobic-hydrophobic, van der Waals interactions and combinations thereof. Analyte specific binding functionalities generally involve complementary 3-dimensional structures involving one or more of the above interactions. Examples of combinations of analyte specific interactions include, but are not limited to, antigens with corresponding antibody molecules, a nucleic acid sequence with its complementary sequence, effector molecules with receptor molecules, enzymes with inhibitors, sugar chain-containing compounds with lectins, an antibody molecule with another antibody molecule specific for the former antibody, receptor molecules with corresponding antibody molecules and the like combinations. Other examples of the specific binding substances include a chemically biotin-modified antibody molecule or polynucleotide with avidin, an avidin-bound antibody molecule with biotin and the like combinations.

"Molecular binding partners" and "specific binding partners" refer to pairs of molecules, typically pairs of biomolecules that exhibit specific binding. Molecular binding partners include, without limitation, receptor and ligand, antibody and antigen, biotin and avidin, and biotin and streptavidin.

As used herein, the terms "polymer" and "polymers" include "copolymer" and "copolymers," and are used interchangeably with the terms "oligomer" and "oligomers." The polymers are selected from homo-polymers and co-polymers. The polymers are optionally cross-linked polymers.

"Attached," as used herein encompasses interaction including, but not limited to, covalent bonding, ionic bonding, chemisorption, physisorption, host-guest interactions and combinations thereof.

"Independently selected" is used herein to indicate that the groups so described can be identical or different.

Introduction

The present invention provides a robust material for the selective adsorption of NO and $NO_2$ in a gas mixture, which is preferably i) not deleteriously affected by the presence of one or more of CO, $CO_2$, $O_2$, and $H_2O$, ii) has an active site efficiency that exceeds 80% (this fraction of active sites are actually active for adsorption), iii) shows promise for future development as a recyclable and reusable NOx storage system. As used herein, a material is not deleteriously affected by the presence of one or more of CO, $CO_2$, $O_2$, and $H_2O$ if the adsorption of the NO and $NO_2$ does not decrease more than 20% of that observed in the absence of CO, $CO_2$, $O_2$, and $H_2O$, preferably not more than 15%, more preferably, not more than 10% and even more preferably, not more than 5%. As used herein, the "absence of CO, $CO_2$, $O_2$, and $H_2O$" refers to gas mixtures that include less than 10% of these contaminating gases, either individually or in combination.

Preferred embodiments of the present invention share the common trait of involving radical-based molecular receptors or interactions with either NO or $NO_2$. This invention couples nitroxyl radical-based active sites, comprising a nitroxide radical, with nitronyl nitroxide-based active sites, in a parallel configuration. The resulting adsorption system functions in accordance with the scheme below. NOx is shuttled between NO and $NO_2$; the latter is ultimately adsorbed by nitroxyl radical sites.

In a preferred embodiment, the nitroxyl radical and nitronyl nitroxide active sites function in a configuration that involves their intimate mechanical mixing, as products of one type of site can then be rapidly transferred to the other type of site for conversion and storage, avoiding degradative side-reactions such as the decomposition of nitronyl nitroxide sites via side reactions with $NO_2$.[6] Certain embodiments of the invention exploit the fact that the kinetics of nitroxyl radical reaction with $NO_2$ are very rapid;[8] these kinetics are likely to be important in explaining why nitroxyl radicals can act as an efficient $NO_2$ adsorbent, even when there are often other, slower, side reactions possible in a system, such as degradation of nitronyl nitroxide sites via reaction with $NO_2$.

Scheme 3. Nitronyl nitroxide sites acting in parallel with nitroxyl radical sites consume NO and $NO_2$ components of a gas mixture.

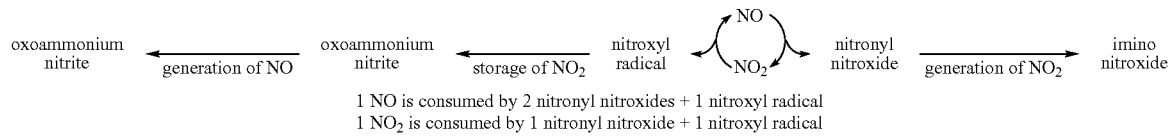

1 NO is consumed by 2 nitronyl nitroxides + 1 nitroxyl radical
1 $NO_2$ is consumed by 1 nitronyl nitroxide + 1 nitroxyl radical An exemplary material of the invention includes nitronyl nitroxide sites anchored on a solid support (either covalently or non-covalently) for rapid NO oxidation to $NO_2$. Although non-covalently immobilized nitronyl nitroxide sites are generally known, to date these systems have been characterized by unreasonably slow reaction times for NO oxidation, which are insufficient to allow for a practical adsorption system because most gas will pass through unreacted considering practical contact times and allow no possibility to store oxidized NO (e.g., $NO_x$, e.g., $NO_2$).[7] The present invention circumvents the shortcomings of previous systems by offering a novel type of arrangement of nitronyl nitroxide active sites and NOx storage sites (e.g., parallel). This arrangement essentially prevents the inactivation of nitroxide sites in the presence of oxidized NO ($NO_x$). It has been discovered, surprisingly, that these types of covalently attached nitronyl nitroxide active sites, while being electronically conjugated to the silica surface and being in proximity to interact with silica, still actively oxidize NO to $NO_2$ almost instantaneously—preferably, at the mass transport rate limit. Such a high level of activity is unexpected because the properties of nitronyl nitroxides, including rate of reaction with NO, depend critically on the functional groups with which the site is in electronic conjugation with.[6] The present invention provides material having a combination of covalently immobilized nitroxyl radical and nitronyl nitroxide active sites functioning in a parallel configuration for the efficient removal of nearly 100% of NO and $NO_2$ from a gas mixture. In an exemplary embodiment, the oxidation of NO to NOx occurs at essentially the theoretical limit of such oxidation. Exemplary systems of the invention oxidize NO to $NO_x$ to at least 90%, preferably at least 92%, preferably at least 94% more preferably at least 96% and still more preferably at least 98%.

The Embodiments

In a first aspect, the invention provides an NOx adsorption system, which is a material that includes: (a) a member selected from an NO oxidation site, a NO adsorption site and combinations thereof, and (b) a member selected from an $NO_2$ adsorption site, an $NO_2$ reduction site and combinations thereof in which x is 1 or 2. In the materials of the invention, the NO oxidation and the $NO_2$ reduction site are independently selected from stoichiometric and catalytic sites. The adsorption sites are preferably bound to a substrate through a binding modality selected covalent and non-covalent attachment.

An exemplary NO oxidation site is a nitroxide, e.g., a nitronyl nitroxide, such as:

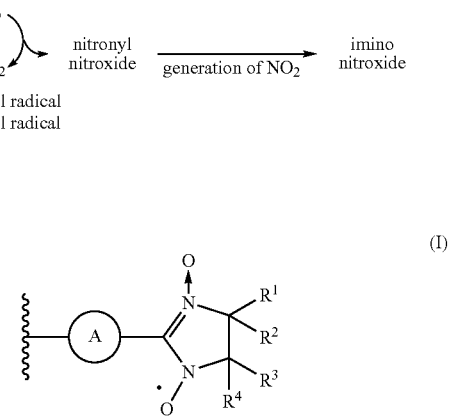

wherein A is selected from aryl and heteroaryl; and $R^1$, $R^2$, $R^3$ and R are members selected from substituted or unsubstituted alkyl, substituted or unsubstituted heteroalkyl, substituted or unsubstituted aryl, substituted or unsubstituted heteroaryl and substituted or unsubstituted heteroarylalkyl.

In yet another exemplary embodiment, A is a member selected from substituted or unsubstituted phenyl. In a still further exemplary embodiment, $R^1$, $R^2$, $R^3$, and $R^4$ are members independently selected from $C_1$-$C_6$ unsubstituted alkyl.

Another exemplary NO oxidation site is a nitrite salt or nitrate salt of an oxoammonium cation, e.g. an oxoammonium nitrite or an oxoammonium nitrate.

In exemplary materials of the invention, one or more of the sites described above is immobilized by covalent attachment or chemisorption or physisorption or host-guest immobilization to a solid support. The solid supports are selected from organic and inorganic materials.

Exemplary solid support materials include, but are not limited to, inorganic crystals, inorganic glasses, inorganic oxides, zeolites, layered (delaminated zeolitic) materials, metals, organic polymers, activated charcoal, carbons and combinations thereof. Inorganic glasses and crystals of use in the substrate include, but are not limited to, LiF, NaF, NaCl, KBr, KI, CaF$_2$, MgF$_2$, HgF$_2$, BN, AsS$_3$, ZnS, Si$_3$N$_4$, AlN and the like. The crystals and glasses can be prepared by art standard techniques. See, for example, Goodman, CRYSTAL GROWTH THEORY AND TECHNIQUES, Plenum Press, New York 1974. Alternatively, the crystals can be purchased commercially (e.g., Fischer Scientific). Inorganic oxides of use in the present invention include, but are not limited to, Cs$_2$O, Mg(OH)$_2$, TiO$_2$, ZrO$_2$, CeO$_2$, Y$_2$O$_3$, Cr$_2$O$_3$, Fe$_2$O$_3$, NiO, ZnO, Ta$_2$O$_5$, Al$_2$O$_3$, SiO$_2$ (e.g., mesoporous silica), quartz, In$_2$O$_3$, SnO$_2$, PbO$_2$, GeO$_2$, aluminosilicates, aluminophosphates, silicoaluminophosphates, zincosilicates, and the like. Metals of use in the substrates of the invention include, but are not limited to, gold, silver, platinum, palladium, nickel, copper, rhodium, iridium and alloys and composites of these metals. In one embodiment, a higher surface area Si support such as MCM-41 and SBA-15 families of mesoporous Si materials is used.

Organic polymers that form useful substrates include, for example, polyalkenes (e.g., polyethylene, polyisobutene, polybutadiene), polyacrylics (e.g., polyacrylate, polymethyl methacrylate, polycyanoacrylate), polyvinyls (e.g., polyvinyl alcohol, polyvinyl acetate, polyvinyl butyral, polyvinyl chloride), polystyrenes, polycarbonates, polyesters, polyurethanes, polyamides, polyimides, polysulfone, polysiloxanes, polyheterocycles, cellulose derivative (e.g., methyl cellulose, cellulose acetate, nitrocellulose), polysilanes, fluorinated polymers, epoxies, polyethers and phenolic resins.

In a preferred embodiment, the solid support material is substantially non-reactive with NOx species, thus preventing non-specific interaction or reaction between the solid support and the NOx species. In another exemplary embodiment, the solid support is coated with a material that prevents reactions between the solid support and the NOx species. Non-reactive coatings for solid supports are generally known in the art. An exemplary coating is poly(ethylene glycol). The proper coating agent for a particular application will be apparent to one of skill in the art.

The active site(s) or materials of the invention is attached to the surface of the solid support by a variety of means. The interaction between the active site and the surface, which anchors the active site to the surface can be a covalent, electrostatic, ionic, hydrogen bonding, hydrophobic-hydrophobic, hydrophilic-hydrophilic or host-guest interaction. When the interaction is non-covalent, it is referred to herein with terms such as, but not limited to, "physical adhesion," "physisorbing," "chemisorbing," "physisorption," or "chemisorption."

The following section is generally applicable to each system, materials and device of the invention. In certain embodiments, the device incorporates a linker arm between the substrate and the active site. The layer of linker arms is of any composition and configuration useful to immobilize the active site. The linker arms are bound to and immobilized on the solid support. The linker arms also have one or more groups that interact with the active site.

In a preferred embodiment, the active site is covalently bound to the solid support by providing the solid support with surface moieties that chemically couple with a reactive group on of the active site, e.g., free isocyanates, alcohols, thiols or amines. Thus, for example, the solid support can have be glass or can include a glass (silicon dioxide) coating that provides hydroxyl groups for reaction with a silane reagent. Alternatively, the surface can have attached amino alkyl silane groups which provide amine groups for reaction with an active site precursor.

In another embodiment, the active site is attached to the surface through a linker arm, which is attached to both the surface and the active site. The linker arms can be selected from organic materials and mixed organic/inorganic materials (e.g., synthetic polymers, as well as small molecule linkers (e.g., alkyl, heteroalkyl, etc.)). A fully assembled linker can be coupled to the solid support. Alternatively, the linker arms can be assembled on the substrate by coupling together linker arm components using a functional group on the substrate as the origin of linker arm synthesis. The point of attachment to either the substrate or active site is preferably at a terminus of the linker arm, but can also be an internal site. The linker arm can be a linear molecular moiety or it can be branched. The linker arms on a substrate may be independent or they may be crosslinked with one another.

Exemplary synthetic linker species useful in the chips of the present invention include both organic and inorganic polymers and may be formed from any compound, which will support the immobilization of the functionalized film. For example, synthetic polymer ion-exchange resins such as poly(phenol-formaldehyde), polyacrylic-, or polymethacrylic-acid or nitrile, amine-epichlorohydrin copolymers, graft polymers of styrene on polyethylene or polypropylene, poly(2-chloromethyl-1,3-butadiene), poly(vinylaromatic) resins such as those derived from styrene, α-methylstyrene, chlorostyrene, chloromethylstyrene, vinyltoluene, vinylnaphthalene or vinylpyridine, corresponding esters of methacrylic acid, styrene, vinyltoluene, vinylnaphthalene, and similar unsaturated monomers, monovinylidene monomers including the monovinylidine ring-containing nitrogen heterocyclic compounds and copolymers of the above monomers are suitable.

Additional polymers include polyester (e.g., poly(lactide), poly(caprolactone), poly(glycolide), poly(δ-valerolactone), and copolymers containing two or more distinct repeating units found in these named polyesters), poly(ethylene-co-vinylacetate), poly(siloxane), poly(butyrolactone), and poly(urethane). Reactive Functional Groups The active sites are preferably anchored to the substrate (or linker arm) through the reaction of complementary reactive groups on the solid support, active site precursor and, optionally, the linker arms. Exemplary reactive functional groups include:

(a) carboxyl groups and various derivatives thereof including, but not limited to, N-hydroxysuccinimide esters, N-hydroxybenztriazole esters, acid halides, acyl imidazoles, thioesters, p-nitrophenyl esters, alkyl, alkenyl, alkynyl and aromatic esters;

(b) hydroxyl groups, which can be converted to esters, ethers, aldehydes, etc.;

(c) haloalkyl groups wherein the halide can be later displaced with a nucleophilic group such as, for example, an amine, a carboxylate anion, thiol anion, carbanion, or an alkoxide ion, thereby resulting in the covalent attachment of a new group at the site of the halogen atom;

(d) dienophile groups, which are capable of participating in Diels-Alder reactions such as, for example, maleimido groups;

(e) aldehyde or ketone groups such that subsequent derivatization is possible via formation of carbonyl derivatives such as, for example, imines, hydrazones, semicarbazones or oximes, or via such mechanisms as Grignard addition or alkyllithium addition;

(f) sulfonyl halide groups for subsequent reaction with amines, for example, to form sulfonamides;

(g) thiol groups, which can be converted to disulfides or reacted with acyl halides;

(h) amine or sulfhydryl groups, which can be, for example, acylated or alkylated;

(i) alkenes, which can undergo, for example, cycloadditions, acylation, Michael addition, etc; and (j) epoxides, which can react with nucleophiles, for example, amines and hydroxyl compounds.

The reactive functional groups can be chosen such that they do not participate in, or interfere with reactions in which they are not intended to participate. Alternatively, the reactive functional group can be protected from participating in the reaction by the presence of a protecting group. Those of skill in the art will understand how to protect a particular functional group from interfering with a chosen set of reaction conditions. For examples of useful protecting groups, See, Greene et al., PROTECTIVE GROUPS IN ORGANIC SYNTHESIS, John Wiley & Sons, New York, 1991.

One skilled in the art will readily appreciate that many of these linkages may be produced in a variety of ways and using a variety of conditions. For the preparation of esters, see, e.g., March supra at 1157; for thioesters, see, March, supra at 362-363, 491, 720-722, 829, 941, and 1172; for carbonates, see, March, supra at 346-347; for carbamates, see, March, supra at 1156-57; for amides, see, March supra at 1152; for ureas and thioureas, see, March supra at 1174; for acetals and ketals, see, Greene et al. supra 178-210 and March supra at 1146; for acyloxyalkyl derivatives, see, PRODRUGS: TOPICAL AND OCULAR DRUG DELIVERY, K. B. Sloan, ed., Marcel Dekker, Inc., New York, 1992; for enol esters, see, March supra at 1160; for N-sulfonylimidates, see, Bundgaard et al., *J. Med. Chem.*, 31:2066 (1988); for anhydrides, see, March supra at 355-56, 636-37, 990-91, and 1154; for N-acylamides, see, March supra at 379; for N-Mannich bases, see, March supra at 800-$O_2$, and 828; for hydroxymethyl ketone esters, see, Petracek et al. *Annals NY Acad. Sci.*, 507:353-54 (1987); for disulfides, see, March supra at 1160; and for phosphonate esters and phosphonamidates, see, e.g., copending application Ser. No. 07/943,805, which is expressly incorporated herein by reference.

Those of skill in the art understand that the reactive functional groups discussed herein represent only a subset of functional groups that are useful in assembling the materials of the invention. Moreover, those of skill understand that the reactive functional groups are also of use as groups to non-covalently bind the NO and/or $NO_2$ absorption site to the substrate.

In the case of a representative substrate, which is coated with a glass-like material, presenting a surface with reactive Si—OH bonds, the anchor moiety will generally include a first functional group of reactivity complementary to the bonds at the surface of the glass, and a second reactive functionality that forms a covalent bond with a reactive functionality of complementary reactivity on the active site precursor. As discussed above, in an exemplary embodiment the complex includes an active site having a nitroxide or nitronyl nitroxide moiety.

Regarding the first functional group, a number of siloxane functionalizing reagents can form bonds to the substrate. Exemplary reagents include, but are not limited to:

1. hydroxyalkyl siloxanes (silylate surface, functionalize with diborane, and $H_2O_2$ to oxidize the alcohol)
    a. allyl trichlorosilane→→3-hydroxypropyl,
    b. 7-oct-1-enyl trichlorchlorosilane→→8-hydroxyoctyl;

2. diol(dihydroxyalkyl) siloxanes (silylate surface and hydrolyze to diol)
    a. (glycidyl trimethoxysilane→→(2,3-dihydroxypropyloxy)propyl;

3. aminoalkyl siloxanes (amines requiring no intermediate functionalizing step)
    a. 3-aminopropyl trimethoxysilane→aminopropyl;

4. dimeric secondary aminoalkyl siloxanes
    a. bis(3-trimethoxysilylpropyl)amine→bis(silyloxylpropyl)amine; and 5. unsaturated species (e.g., acryloyl, methacryloyl, styryl, etc.).

Exemplary anchor reagents according to motif 4, above, include styrylethyltrimethoxysilane, styrylethylmethyldimethoxysilane, styrylethyldimethylmethoxysilane, styrylethyltrichlorosilane, styrylethylmethyldimethoxysilane, styrylethyldimethylmethoxysilane, (3-acryloxypropyl)trimethoxysilane, (3-acryloxypropyl)methyldimethoxysilane, (3-acryloxypropyl)dimethylmethoxysilane, (3-acryloxypropyl)trichlorosilane, (3-acryloxypropyl)methyldichlorosilane, (3-acryloxypropyl)dimethylchlorosilane, (3-methacryloxypropyl)trimethoxysilane, (3-methacryloxypropyl)methyldimethoxysilane, (3-methacryloxypropyl)dimethylmethoxysilane, (3-methacryloxypropyl)trichlorosilane, (3-methacryloxypropyl)methyldichlorosilane, (3-methacryloxypropyl)dimethylchlorosilane and combinations thereof.

In an exemplary embodiment, an anchor reagent having a polymerizable moiety set forth above is coupled to a active site precursor that is derivatized with a polymerizable moiety of complementary reactivity.

In an exemplary embodiment, in which an active site is a nitronyl nitroxide, it is anchored to the solid support through the use of a corresponding silane reagent. Exemplary nitronyl nitroxide silane reagents ("active site precursors) include:

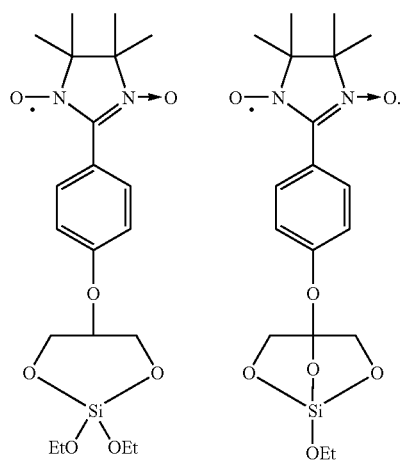

An exemplary immobilized nitronyl nitroxide of use in the materials of the invention has the formula:

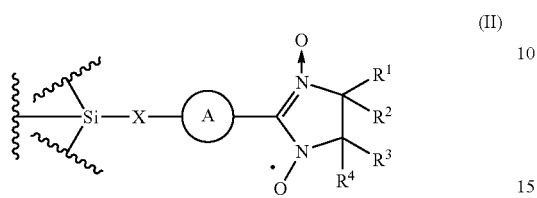
(II)

wherein X is a member selected from O, S, NH, substituted or unsubstituted alkyl and substituted or unsubstituted heteroalkyl.

In another embodiment, the invention provides a material comprising a moiety according to Formula I or II. An exemplary material according to this format further includes an immobilized nitroxide radical that traps $NO_x$, e.g., $NO_2$ species.

Exemplary nitroxide radical silane reagents ("active site precursors") include:

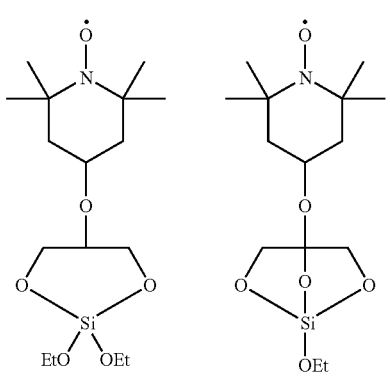

In an exemplary embodiment, the invention provides a system such as that set forth below:

Total $NO_x$ Storage System:
Nitronyl Nitroxide Site

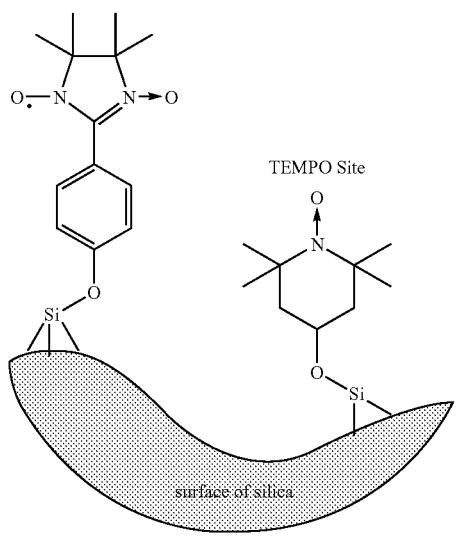

TEMPO Site

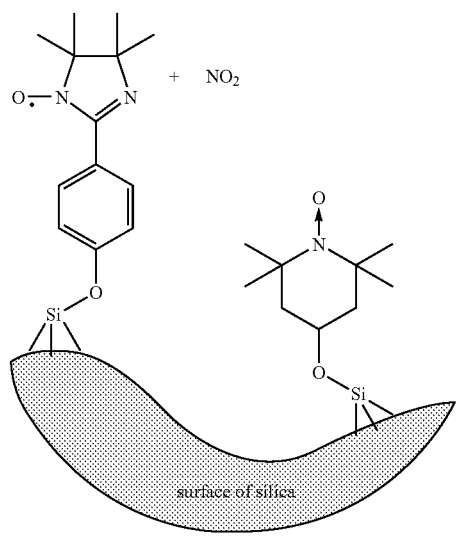

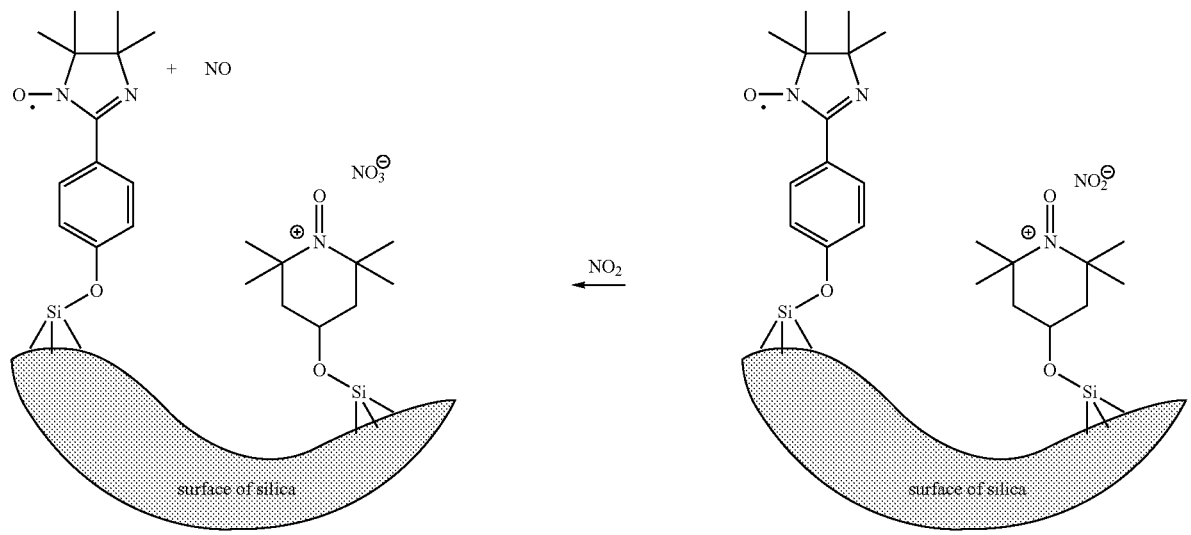

NO: Each NO consumes single nitronyl nitroxide site + 0.5 TEMPO site
NO₂: Each NO₂ consumes single TEMPO site + 0.5 nitronyl nitroxide site Though the material of the invention is exemplified by a silica-immobilized system in which both active sites are anchored to the same solid support, those of skill will appreciate that the active sites can be anchored to different solid supports, wherein each solid support has the same or different composition.

In yet another embodiment in which the active site is a thiyl radical, precursors for attaching these species to a SiO₂ solid support and a method of preparing these precursors is set forth below:

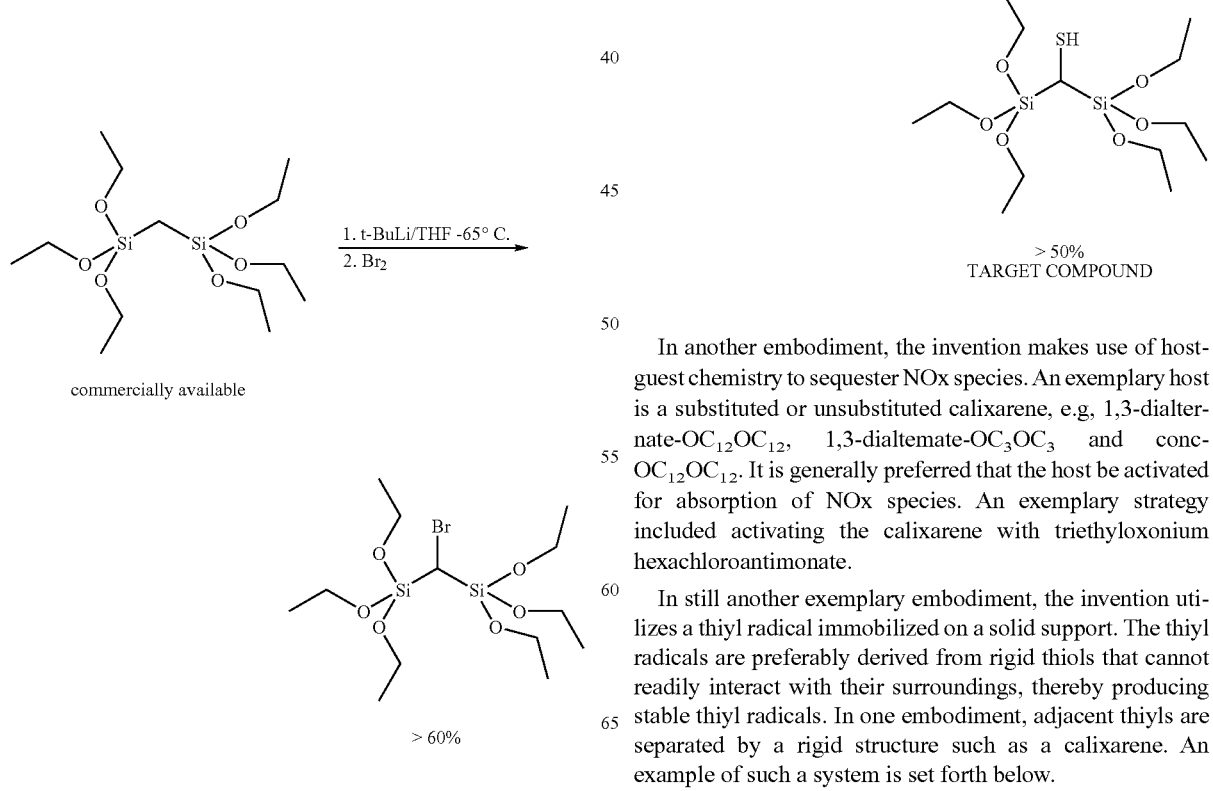

In another embodiment, the invention makes use of host-guest chemistry to sequester NOx species. An exemplary host is a substituted or unsubstituted calixarene, e.g, 1,3-dialternate-OC$_{12}$OC$_{12}$, 1,3-dialtemate-OC$_3$OC$_3$ and conc-OC$_{12}$OC$_{12}$. It is generally preferred that the host be activated for absorption of NOx species. An exemplary strategy included activating the calixarene with triethyloxonium hexachloroantimonate.

In still another exemplary embodiment, the invention utilizes a thiyl radical immobilized on a solid support. The thiyl radicals are preferably derived from rigid thiols that cannot readily interact with their surroundings, thereby producing stable thiyl radicals. In one embodiment, adjacent thiyls are separated by a rigid structure such as a calixarene. An example of such a system is set forth below.

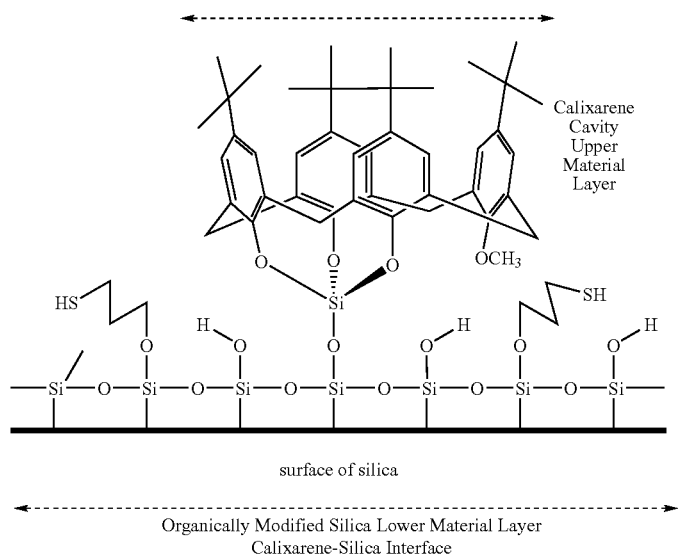

surface of silica

Organically Modified Silica Lower Material Layer
Calixarene-Silica Interface

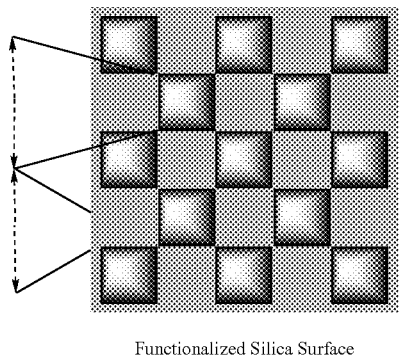

Functionalized Silica Surface

This scheme illustrates the use of a anchored calixarene as a mechanical barrier for preventing two thiols from approaching each other on the surface of the solid support, e.g., silica. The thiyl radicals in this material are prevented from extinguishing each other and forming disulfides. The thiol isolation strategy above relies on mechanically blocking disulfide formation by preventing two thiols to approach each other with the use of the calixarene as a barrier. An alternative strategy is to make a thiol so rigid that it will be impossible to form disulfides—even if two sulfides are located close to each other.

When the material of the invention includes more than one type of active site, the active sites can be on the same solid support or on different solids supports. For example, n in one embodiment, a member selected from an NO oxidation site, a NO adsorption site and combinations thereof are bound to a first solid support, and a member selected from an $NO_2$ adsorption site, an $NO_2$ reduction site and combinations thereof are bound to a second solid support.

Exemplary dual active site systems and their reactions with NOx species are set forth below:

(see for example J. Chem Soc., Perkin Trans II 2001, 1139-1144; Nitric Oxide: Biology and Chemistry 2001, 116-127), the systems disclosed in these references cannot be regenerated, and moreover, the reactions are non-selective and form several products. Because of the latter, it is not even possible to attempt to address the question of reaction reversibility and regeneration.

In a preferred embodiment, the material includes an active site that synthesizes $NO_2$ from NO. The effluent from this process is fed into a nitroxide radical on a solid support (e.g., TEMPO on silica material), to further adsorb the synthesized NO. One such active site that shows excellent potential for this type of a transformation is PTIO (2-phenyl-4,4,5,5-tetramethylimidazoline 3-oxide 1-oxyl) active site. PTIO reacts with NO to produce PTI and $NO_2$ (see reaction 1 on p 1673 of Analytical Chemistry 1977, 49, 1673-1676; see equation 1 on p 1871 of Analytical Chemistry 1978, 50, 1871-1873; The Journal of Biological Chemistry 2003, 278, 50949-50955; Biochemistry 1993, 32, 827-832) according to the reaction below:

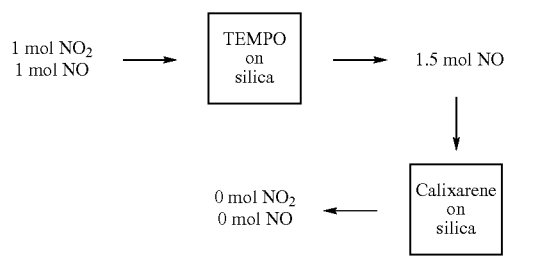

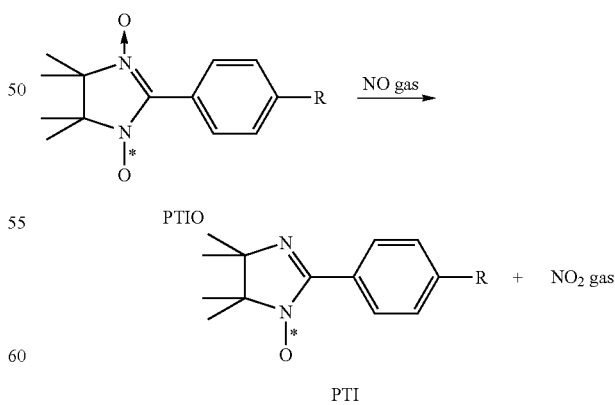

The complementary roles played by TEMPO on silica and calixarene on silica materials can be used to selectively remove NO and $NO_2$ from a gas stream. Note that in this case because NO does not react with TEMPO while $NO_2$ does react with calixarene (can nitrate), it is desirable to first remove all $NO_2$ using TEMPO on silica, followed by NO using calixarene on silica materials. Though there are other active sites available besides calixarenes that react with NO This reaction is relatively insensitive to the presence of excess $NO_2$, and tolerance for $SO_2$, H2S, and ozone has already been reported (see p 1676 of Analytical Chemistry 1977, 49, 1673-1676). Because of its tolerance to $NO_2$, a solid support that contains a mixture of PTIO and TEMPO can essentially completely adsorb an NOx mixture. The PTIO serves to convert any NO, whether either originally fed or produced by TEMPO, into $NO_2$. The $NO_2$ is subsequently partially adsorbed by TEMPO and partially converted into NO. The process is shown schematically below. Note that both TEMPO and PTIO can be on the same support because they are both insensitive to excess amounts of NO (for TEMPO) and $NO_2$ (for PTIO). A critical challenge that would be necessary to achieve upon demonstrating proof of principle would be regeneration of the n-oxide moiety. The advantage of using the PTIO system is that reaction with NO is very clean (selective) and progresses to completion. Such a combination of TEMPO and PTIO in one material is a powerful NOx removal agent, even if used without a reversibility/regenerability aspect.

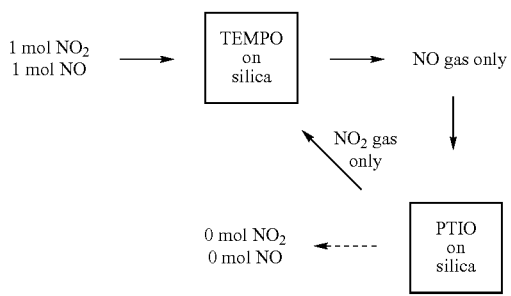

In another embodiment, the invention provides a device that includes (a) a system of the invention and (b) a container for said system, wherein said container comprises a gas inlet port and a gas outlet port.

In an exemplary embodiment, the device is one in which a system of the invention is incorporated into a trap, e.g., an irreversible trap, as a filter for NOx storage in an automobile as a solution to cold start needs. In another exemplary embodiment, the system of the invention is incorporated into a cigarette filter.

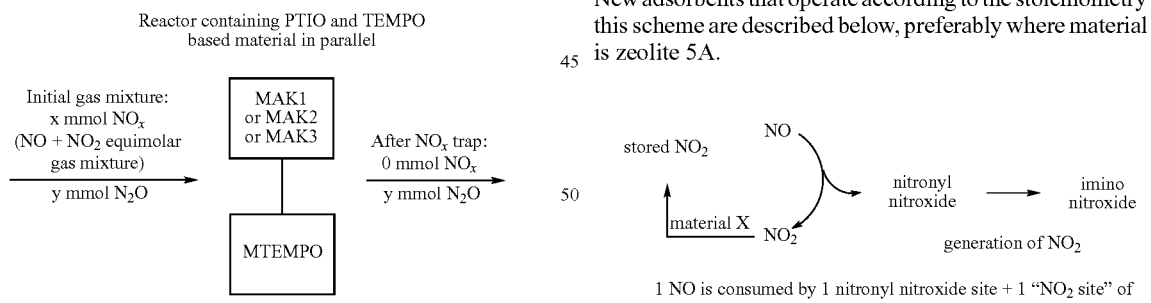

Also provided is a method of oxidizing NO to $NO_2$. The method includes contacting NO with a nitronyl nitroxide under conditions appropriate to oxidize NO to $NO_2$, thereby oxidizing NO to $NO_2$. The nitronyl nitroxide is preferably covalently attached to a solid support. In some embodiments, the method includes contacting NO with oxoammonium nitrite or oxoammonium nitrate under conditions appropriate to oxidize NO to $NO_2$, thereby oxidizing NO to $NO_2$. Where oxoammonium cations are involved, the oxoammonium cation is reduced by NO to form nitronyl nitroxide. Preferably, the oxoammonium nitrite or oxoammonium nitrate is covalently attached to a solid support.

Other types of relevant materials are of use in a different type of $NO_2$-trapping material in the systems, devices and methods of the invention, for example, BaO, instead of TEMPO.

The present invention is exemplified by several fundamentally different approaches for removing NOx from a mixture: i) adsorption of NO using isolated immobilized thiyl radicals, ii) adsorption of NO using immobilized calixarene cation radicals, iii) adsorption of $NO_2$ using TEMPO active sites, including regeneration after adsorption, iv) room temperature reaction of NO to form $NO_2$ using nitronyl nitroxide (PTIO-type) active sites according to the reaction, v) parallel generation of $NO_2$ from NO using NO oxidation sites with concomitant adsorption of $NO_2$ using NOx storage sites, where both types of sites are present and may be attached to a support, and are operating in a parallel configuration in the same reactor and potentially even in the same material, leading to the complete removal of all NOx species.

The immobilized TEMPO on silica system in item (iii), is of use both on its own for $NO_2$ adsorption, as well as in a parallel configuration with PTIO-type active sites in the same reactor, for the total adsorption of NO and $NO_2$ species within a single material at low temperatures. Item (iii) allows for the successful implementation of a system of the invention for NOx adsorption, and reversible NOx adsorption. The concept in item (iii) is novel and allows any mixture of NO and $NO_2$ to be adsorbed from a gas stream—because the interconversion to $NO_2$ and adsorption of $NO_2$ are performed in parallel if both sites are on the same material. An alternative application involves having each type of site immobilized separately on a material, and then having both types of materials, each containing either a nitroxide radical (e.g., TEMPO) or nitronyl nitroxide site (e.g., PTIO), mixed in the reactor. Performance is enhanced with greater degrees of TEMPO and nitronyl nitroxide mixing. The material in item (iii) forms the basis for an total NOx storage system that completely removes NO and $NO_2$ in a gas feed.

In another embodiment, the stoichiometry described in Scheme 4 below is utilized, in particular where 1 NO is consumed by a single nitronyl nitroxide site and 1 $NO_2$ is consumed without consumption of a nitronyl nitroxide site. New adsorbents that operate according to the stoichiometry in this scheme are described below, preferably where material X is zeolite 5A.

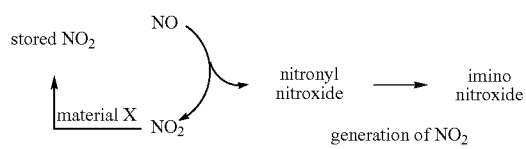

1 NO is consumed by 1 nitronyl nitroxide site + 1 "$NO_2$ site" of material X 1 $NO_2$ is consumed by 1 "$NO_2$ site" of material X Scheme 4. Nitronyl nitroxide sites acting in parallel with $NO_2$ storage sites of material X consume NO and $NO_2$ components of a gas mixture in a fashion that involves fewer nitronyl nitroxide sites per NOx consumed.

In one embodiment, either a zeolite 5A (60-80 mesh; Agilent #5080-6761; Aldrich Chemical #20302) or activated charcoal (untreated powder; 100 mesh; Aldrich #C3345) can act as the $NO_2$ adsorption site, and a nitronyl nitroxide can act as the NO oxidation site in this system. A system based on these two particular sites carries the advantage of being active for $NO_x$ storage at low temperatures, typically less than 200°

C., which cannot be achieved with conventional metal-containing active sites. An additional advantage is that less nitronyl nitroxide per NO adsorbed is necessary in this configuration than when TEMPO-based sites are used for $NO_2$ adsorption, thus lowering cost of NOx adsorbent in application. Another advantage is lack of toxic or known carcinogenic components within the combined material, as well as lack of metal active sites for NO adsorption. A final advantage is sulfur tolerance, due to the fact that all sites can be sulfur-resistant to $SO_x$ species.

EXAMPLES

Example 1

Reactions were performed under nitrogen atmosphere, and solvents were dried and distilled by standard methods. Deoxygenation of methanol was performed by bubbling dry argon through the solution for 15 min. Triethylamine was distilled over $CaH_2$ and stored over molecular sieves. TEMPO-OH and 2-Nitropropane were purchased from commercial sources in analytical grade and were used as received. Compounds 2-5 were synthesized using established literature procedures.[7,9,10] $^1$H NMR spectra were recorded in $CDCl_3$ on a Bruker AV-300 (300 MHz) instrument. The $^1$H NMR data are referenced to residual $CHCl_3$ (7.25 ppm) in the solvent. Analytical thin-layer chromatography was performed on precoated silica gel plates (0.25 mm, 60F-254, Merck), and silica gel (Selecto 60) was used for column chromatography. FAB-MS spectra were recorded with using O-nitrophenyl octyl ether (NPOE) as matrix.

1.1 Synthesis of 2-(4'-Triethoxysilyloxyphen-1'-yl)-4,4,5,5-tetramethylimidazolidine-3-oxide-1-oxyl (6)

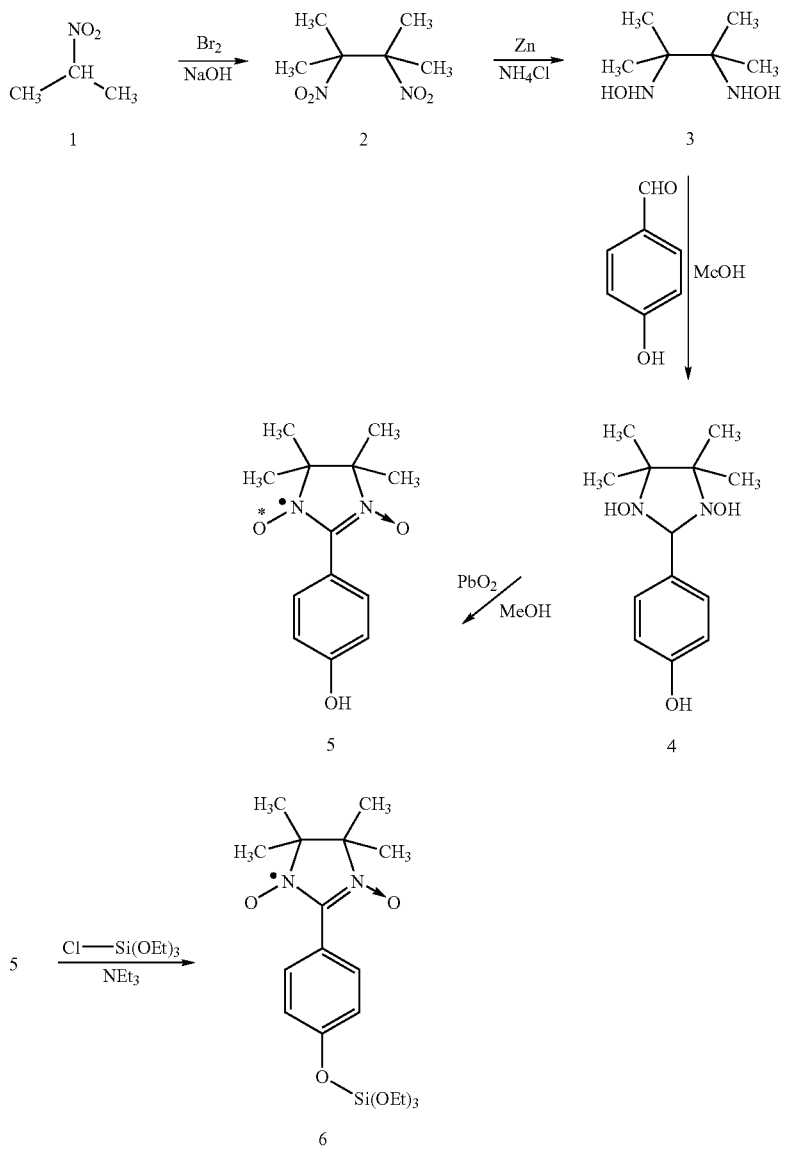

To a solution of 5 (70 mg, 0.28 mmol) and dry triethylamine (47 μL, 0.34 mmol) in 2 mL of dry dichloromethane, triethyloxysilylchloride (66 μL, 0.34 mmol) was added dropwise over a duration of 10 min at a temperature of 0° C. The stirring was continued at room temperature for a period of 3 h. The resulting dark blue mixture was evaporated to dryness, and the residue was washed with hexane. Evaporation of the hexane extract solution gave a dark blue oil. Final purification was performed using column chromatography (eluent dichloromethane/ethyl acetate 1/1, $R_f$ 0.8). Dark blue oil, yield 57%. FAB MS m/z 412 [M+H$^{30}$], 397 [M−O+H$^+$].

1.2 Synthesis of 4-Triethoxysilyloxy-2,2,6,6-tetramethylpiperidine-1-oxyl (8)

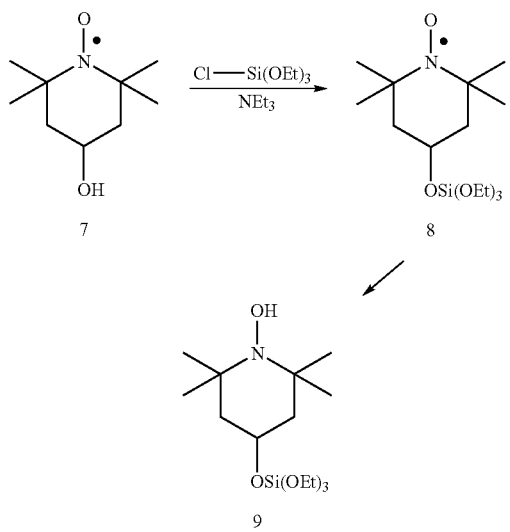

Scheme 6. Synthesis of a nitroxyl radical-containing organosilane monomer.

A mixture of TEMPO-OH (2.0 g, 0.012 mol), triethylamine (1.4 g, 0.014 mol), and triethoxysilylchloride (2.8 g, 0.014 mol) in 35 mL of dry dichloromethane was stirred at room temperature for 2 h. The white solid formed was separated via filtration, and the residual solution was evaporated to dryness to yield an orange-red oil, which was purified with column chromatography (dichloromethane/ethyl acetate 1/0.1, $R_f$ 0.9). Orange oil, yield 53%. FAB MS m/z 334 M$^+$. HR FAB MS 334.204670, calculated for $C_{15}H_{32}N_1O_5Si$ 334.204977 (0.9 ppm). Reduction of radical 8 to diamagnetic 9 has been accomplished by addition of an equimolar quantity of phenylhydrozine to an NMR tube. Recorded NMR spectra shows almost quantitative convertion to 9. $^1H$ NMR δ (CDCl$_3$) 1.306 (m, 12H+9H, CH$_3$C+CH$_3$CH$_2$), 1.811 (m, 2H, CH), 1.998 (m, 2H, CH), 3.900 (q, 6H, J 7.2 Hz, OCH$_2$), 4.294 (m, 1H, CHOSi).

Example 2

Synthesis of materials involves the covalent attachment of nitroxyl radicals and nitronyl nitroxides to the surface of silica. In the case of the nitronyl nitroxide, this type of covalent attachment to a material has not been demonstrated previously and relies on the unobvious assumption that the electronic conjugation of the nitronyl nitroxide site with silica, as well as its anchoring and through-space interactions with the silica surface, will still preserve its chemical connectivity, electronic characteristics, and, ultimately, its oxidation reactivity, particularly with NO. This is especially so in light of previous studies that have shown that the properties of nitronyl nitroxides, including rate constant for oxidation with NO, depend critically on the composition of the "R" group shown in Scheme 2.[6]

2.1 Preparation of Radical Covered Silica Gels (Path A Using Organosilyl Precursors)

2.1(a) Path A: Preparation of MTEMPO and MAK1

This path involves the direct hydrolysis and condensation of organosilane radicals onto the surface of silica. Thus, immobilization of radicals 6 and 8 was accomplished by treating the radical (0.55 mmol) with 1.27 g commercial silica gel (Selecto, 100-200 mesh) in 15 mL dichloromethane as solvent. The resulting mixture was stirred for 4 h at room temperature. The colored silica was filtered and washed with 80 mL of dichloromethane. The materials were subsequently dried under vacuum for 3 h. Material MAK1, containing covalently immobilized 6, was dark blue in color. Material MTEMPO, containing covalently immobilized 8, was light orange in color. The active site concentration on the silica surface was estimated using elemental analysis and thermogravimetric analysis.

Elemental Analysis:
MTEMPO: ($C_{11}H_{22}NO_2Si$ active site) C 3.63%, H 1.12%, N 0.34%. Estimated concentration of active sites is 0.27 mmol/g.
MAK1: ($C_{15}H_{21}N_2O_2Si$ active site) C 7.76%, H 1.54%, N 1.34%. Estimated concentration of active sites is 0.43 mmol/g.

2.1(b) Path B: Preparation of Alkoxy-Silica MSiOEt1 and MSiOEt2

This path involves the ethoxylation of the silica surface, followed by reaction of the ethoxylated surface with alcohols containing the desired active site. Commercially-available Silica Selecto 100-200 mesh was dehydrated at 150° C. for 24 h. 4.45 g of silica were mixed with 70 mL of dry toluene. The solution was heated to reflux under nitrogen, and 1.3 g of triethoxychlorosilane was added dropwise during the course of 5 min. The reaction was continued for 15 min in the case of MSiOEt1 and for a period of 24 h for the case of MSiOEt2. The mixture was cooled to room temperature under nitrogen atmosphere, and the solid was removed via filtration, and washed with toluene. The colorless solid was dried under a reduced pressure of 50 mtorr at 120° C. for a period of 2 h.

MSiOEt1 (1.5 g) was suspended in 15 mL of dry dichloromethane, and a solution of radical-OH 5 (0.44 mmol) in 5 mL of dichloromethane was added. After 20 min of stirring at room temperature, the dark blue solution turned colorless concomitant with a changing color of the silica from colorless to dark blue. Stirring was continued for an additional 2 h. The solid was separated via filtration and washed with 50 mL of dichloromethane. The dark blue solid was treated under a reduced pressure of 50 mtorr for 1 h at room temperature.

Using MSiOEt2 instead of MSiOEt1 in above described synthetic procedure gave dark blue material MAK3.

Elemental Analysis:
MAK2: ($C_{15}H_{21}N_2O_2Si$ active site) C 4.22%, H 1.02%, N 0.54%. Estimated concentration of active sites on silica is 0.23 mmol/g. UV-Vis of material showed wide band with maxima at 580 nm.

MAK3: Elemental analysis MAK3: ($C_{15}H_{21}N_2O_2Si$ active site) C 6.47%, H 1.32%, N 0.72%. estimated concentration of active site 0.36 mmol/g.

Scheme 7. Synthesis of radical covered silica gels using path A, which relies on organosilane radical hydrolysis and condensation.

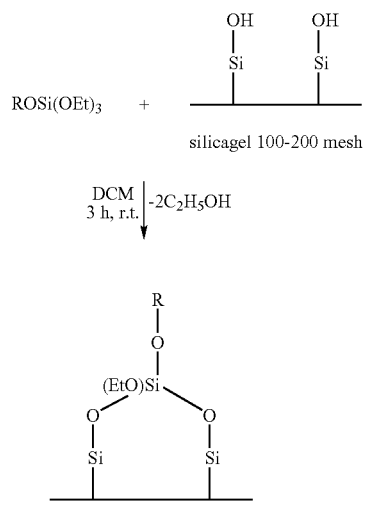

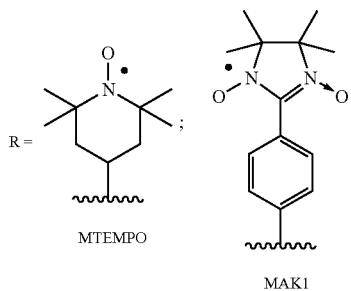

MTEMPO ; MAK1

Example 3

3.1 Preparation of Radical Covered Silica Gels (Path B Using Ethoxylated Silica)

Scheme 8. Synthesis of radical covered silica gels using path B, which relies on ethoxylated silica.

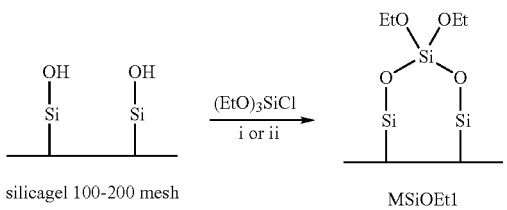

(i) toluene, reflux, 15 min (MSiOEt1)
(ii) toluene, reflux, 24 h (MSiOEt2)

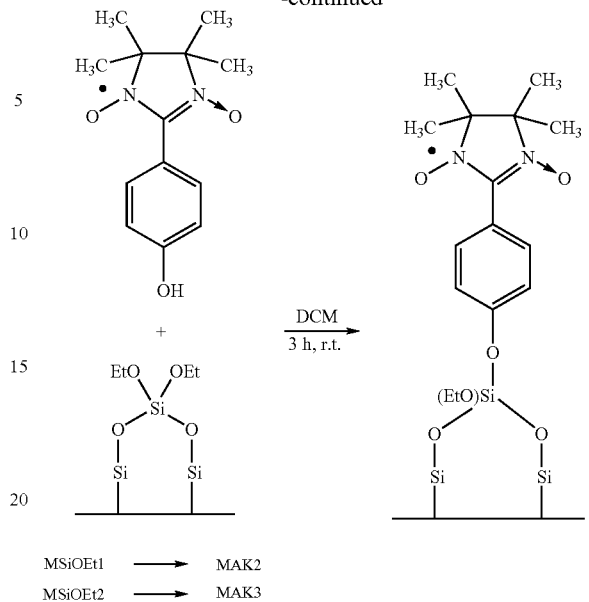

MSiOEt1 → MAK2
MSiOEt2 → MAK3

Example 4

The ability of an intimate mechanical mixture of nitronyl nitroxide and nitroxyl radical active sites functioning in parallel to remove NO and $NO_2$ components of a gas mixture was qualitatively analyzed. The procedure involved placing the mixture of materials inside of a U-tube reactor so as to make a bed and subsequently flowing an equimolar mixture of NO and $NO_2$ through this bed. The bed is expected to turn color from blue (dark) to yellow (light) upon oxidizing NO and adsorbing $NO_2$ as the nitrate salt. A sharp front moving through the bed slowly with time (much slower than the contact time of the the reactor bed) is consistent with a mass transport limited reaction within the bed. Thus, approximately 230 mg of MAK3 and 204 mg MTEMPO were thoroughly mixed to produce a homogeneous in appearance, blue powder and placed inside of the reactor, such that the number of nitronyl nitroxide to nitroxyl radical sites in the reactor was 1.5. A gas flowrate of 60 cc/min consisting of 4000 ppm of total NOx comprising equimolar NO and $NO_2$ was flowed through the bed, and several minutes after starting the flow, a photograph of the reactor was taken, showing a sharp boundary between reacted and unreacted material in the bed. This result is consistent with rapid storage of NOx when using an intimate mechanical mixture of nitronyl nitroxide and nitroxyl radical active sites functioning in parallel.

Figure 2:
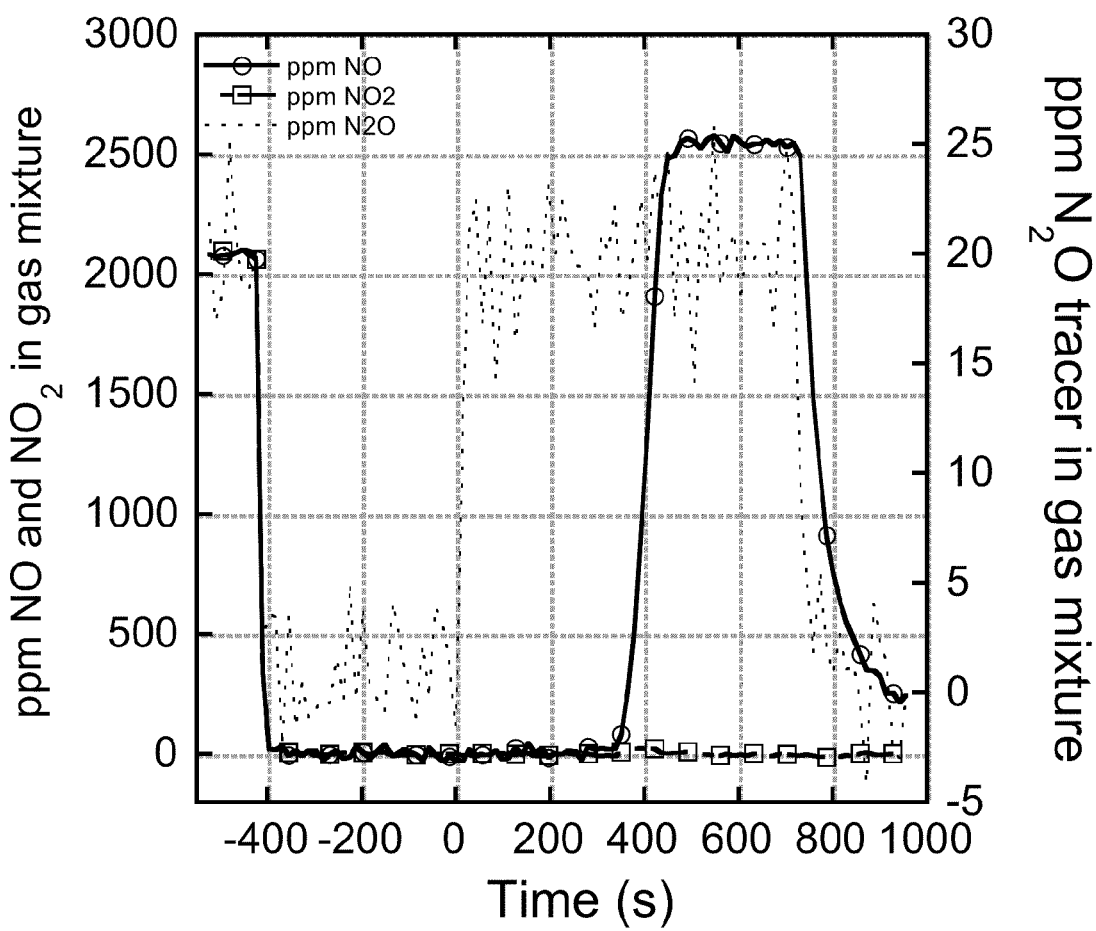
FIG. 2. Amount of NO, $NO_2$, and $N_2O$ exiting reactor as a function of time on stream during treatment of an intimate mechanical mixture of materials MAK2 and MTEMPO with NOx in He gas mixture. $N_2O$ was used as a non-interacting (inert) tracer for correcting for the dead volume present in the reactor system, and time t=0 was arbitrarily defined as the start of the NOx flow to the reactor.

A quantitative test for the disappearance of NO and $NO_2$ in a gas mixture being treated over an intimate mechanical mixture of anchored nitronyl nitroxide and nitroxyl radical active sites functioning in parallel was performed according to Scheme 12. Thus, 426 mg of MAK2 and 242 mg of MTEMPO was thoroughly mixed to produce a homogeneous in appearance, blue powder. These relative amounts were used so as to maintain a nitronyl nitroxide to nitroxyl radical ratio of 1.5 within the reactor, which is the required ratio for the complete adsorption of an equimolar NO and $NO_2$ gas mixture, using predicted stoichiometry as defined in Scheme 3. The mixed powder was subsequently placed in a U-tube reactor equipped with a frit as shown in Scheme 13. Subsequently, a gas mixture comprising equimolar amounts of NO and $NO_2$, and having a total NOx concentration of 4170 ppm in He was passed through the sample at a volumetric flowrate of 60 $cm^3$/min at room temperature and 1 atmosphere absolute pressure. An inert and non-interacting tracer, $N_2O$, identifies the dead volume present in the reactor and the time at which all gases should be exiting the reactor if there is no consumption occurring. The concentration of NO and $NO_2$ exiting the sample was quantified with a FTIR gas analyzer placed at the reactor outlet, and is shown in FIG. 2. A breakthrough time of 6.38 minutes was measured, before which time, complete NOx removal corresponding to greater than 99% of NOx removed from the gas phase occurred. The NOx capacity of the bed corresponding to the measured breakthrough time requires that greater than 95% of the total sites in the bed were active for reaction and storage of NOx in this example.

Scheme 12. Reaction of mixture of nitronyl nitroxide-based (MAK1, MAK2, MAK3) and nitroxyl radical-based (MTEMPO) materials functioning in a parallel configuration for the complete removal of NOx.

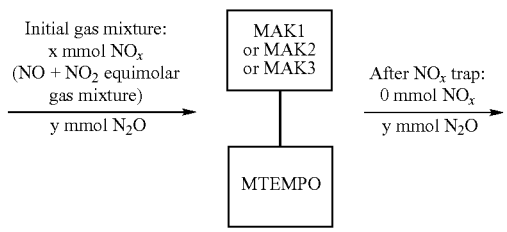

Scheme 13.

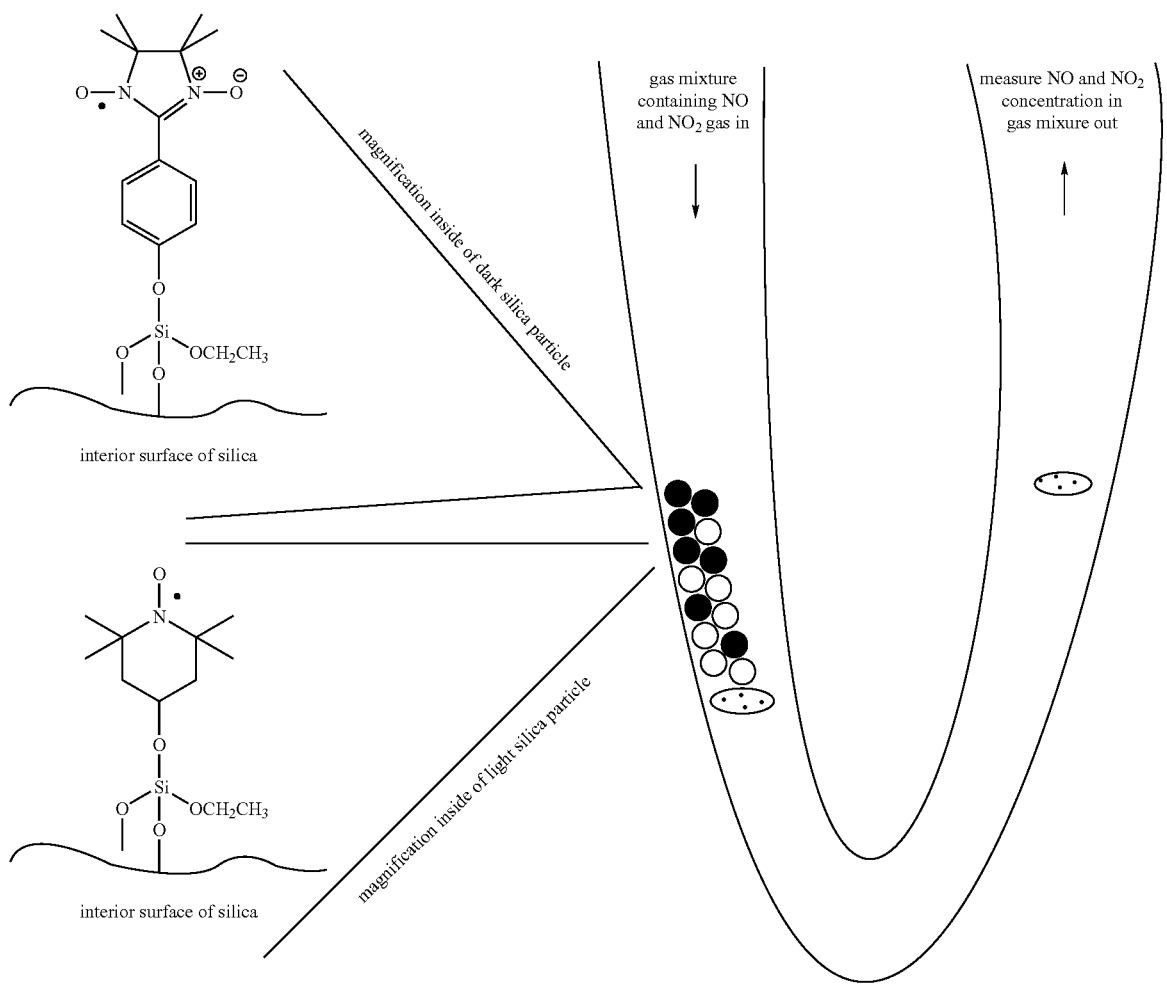

Considering a typical amount of NO released in tobacco smoke from a cigarette to be 62 μg,[5b] it is possible to determine the amount of material that would be required to remove all of this NO, using the stoichiometries defined in Scheme 12 and verified by the data of FIG. 2. Thus, a mixture of 18 mg of MAK2 and 8 mg of MTEMPO suffices to remove all NO in tobacco smoke arising from a cigarette. This 26 mg mixture can readily be incorporated within a filter device for tobacco smoke by known methods obvious to one skilled in the art of the invention.

Example 5

Below we describe examples of NOx receptors consisting of nitronyl nitroxide sites anchored on a solid support for rapid NO oxidation to $NO_2$, and functioning in a parallel configuration with material X, wherein material X in examples below is either zeolite 5A or activated charcoal, both of which are known to be storage materials for $NO_2$ adsorption in the prior art (see U.S. Pat. No. 5,670,125 describing the use of zeolite 5A as a preferred $NO_2$ adsorbent; see Carbon, volume 35, issue 9, pp. 1321-1327 describing the use of activated carbon for adsorbing $NO_2$). The zeolite 5A sample was acquired through the Aldrich Chemical Company (Aldrich product #20302; Agilent product #5080-6761), with a particle size of 60-80 mesh, and was activated by heating to 120° C. for 3 hours prior to mixing with immobilized nitronyl nitroxide active sites. The activated charcoal was also acquired through the Aldrich Chemical Company (Aldrich product #C3345), and was used with a particle size of 100 mesh without further pretreatment. Note that while both the charcoal and zeolite samples produce some minor amount of NO while storing $NO_2$, this amount is smaller than 0.5 for the activated charcoal, and it is smaller than 0.2 for the zeolite. Saturation $NO_2$ adsorption capacities of these materials were measured at room temperature to be 0.65 mmol $NO_2$ per gram of zeolite 5A and 2.5 mmol $NO_2$ per gram of activated charcoal; below, in making mixtures of these materials as material X, with immobilized nitronyl nitroxide sites, large excesses of the material X are used relative to the minimum amount for avoiding saturation of sites with $NO_2$, so as to facilitate good mixing between material X and the immobilized nitronyl nitroxide site materials. In general, material X is any $NO_2$ adsorbent that preferably produces little to no NO upon $NO_2$ adsorption. Below, we characterize how intimate mechanical mixtures of immobilized nitronyl nitroxides function together with the different forms of material X described above can be used to adsorb NO in stoichiometries that equal, within experimental uncertainty, 1.0 NO consumed per single nitronyl nitroxide site.

Figure 3:
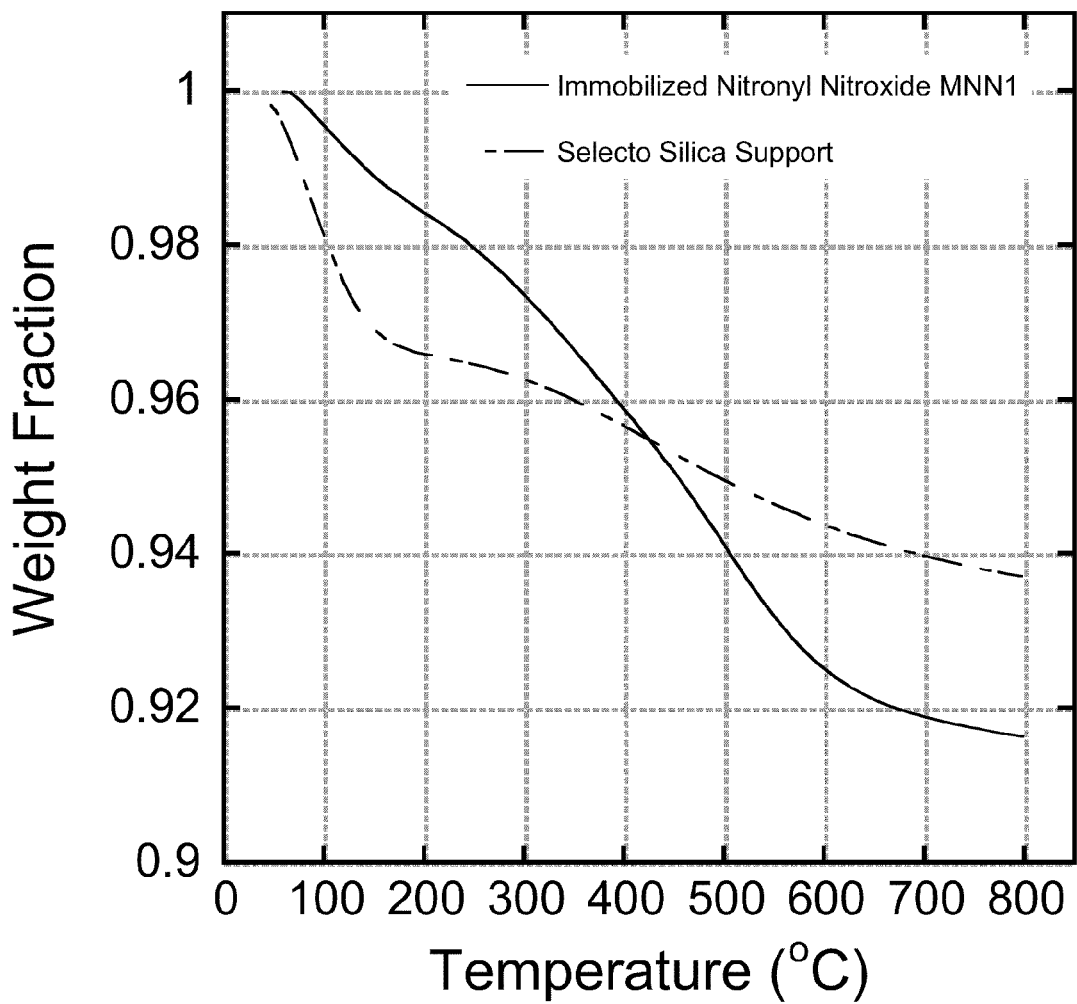
FIG. 3. Thermogravimetric analysis performed with a ramp rate of 5° C. per minute in air for the blank silica support (Selecto Silica Support), and nitronyl nitroxide-containing material MNN1.

Immobilized nitronyl nitroxide on silica material MNN1 was prepared according to procedures in Scheme 8 above, using 24 h toluene reflux. The number of nitronyl nitroxide sites per gram of material was measured using thermogravimetric analysis data from FIG. 3 to be 0.135 mmol of nitronyl nitroxide per gram of material.

A quantitative test for the disappearance of NO and $NO_2$ in a gas mixture being treated over an intimate mechanical mixture of anchored nitronyl nitroxide and material X, which was either zeolite 5A or activated charcoal active sites, was performed according to Scheme 15. The mixed powder consisting of anchored nitronyl nitroxide and material X was subsequently placed in a U-tube reactor equipped with a frit as shown in Scheme 16. Subsequently, a gas mixture comprising NO in He, and having a total NO concentration of 2000 ppm in He was passed through the sample at a volumetric flowrate of 60 cm³/min at room temperature and 1 atmosphere absolute pressure, at room temperature. The concentration of NO and $NO_2$ exiting the sample was quantified with a FTIR gas analyzer placed at the reactor outlet. A breakthrough time was measured, before which time, complete NOx removal corresponding to greater than 99% of NOx removed from the gas phase occurred.

Scheme 15. Reaction of mixture of
immobilized nitronyl nitroxide-based MNN1
and $NO_2$ adsorbent materials functioning in
a parallel configuration for the complete removal of NOx.

Reactor containing materials consistng of i) immobilized nitronyl nitroxide sites and ii) $NO_2$ adsorption sites, operating in a parallel configuration as a result of the intimate mechanical mixing of the two materials.

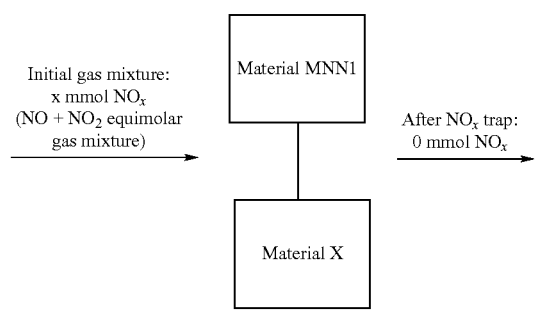

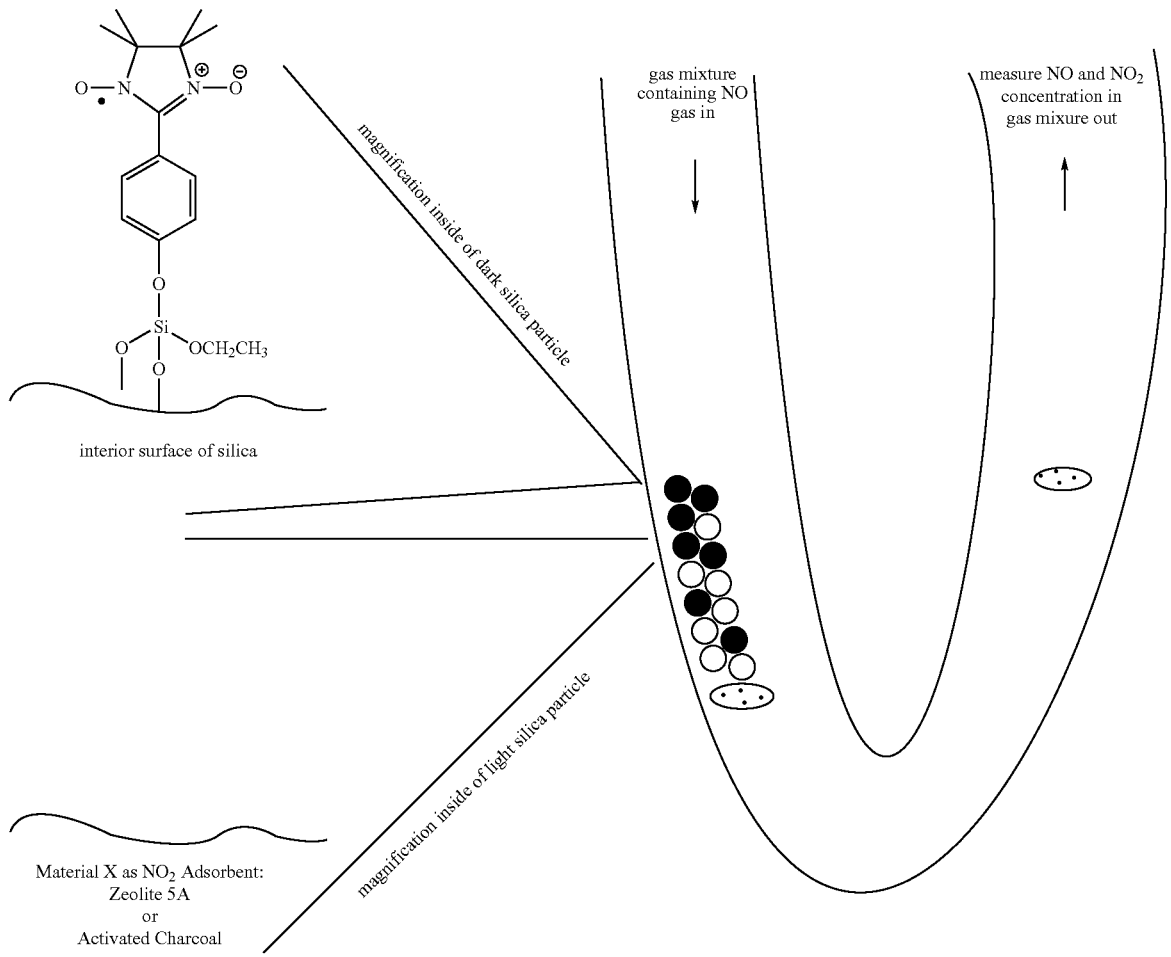

Scheme 16. U-tube reactor configuration used to evaluate mixtures of MNN1 and material X for NO removal from a gas mixture.

Figure 4:
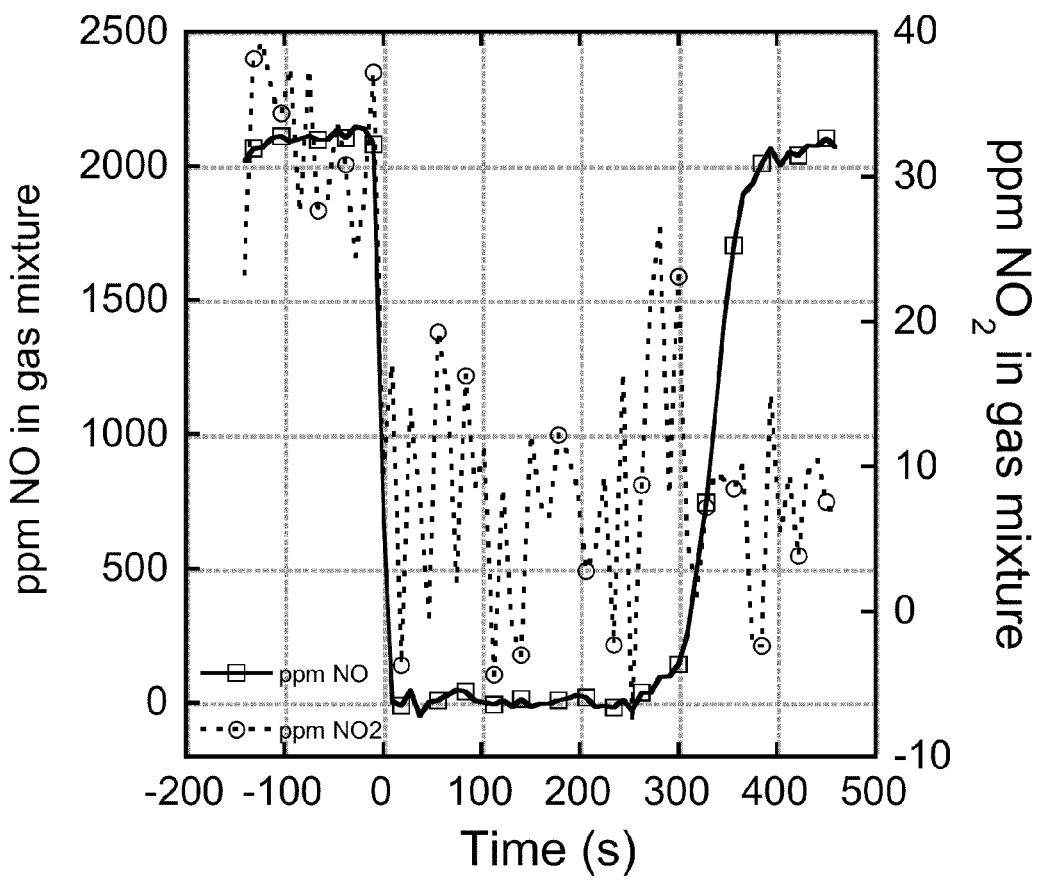
FIG. 4. Amount of NO and $NO_2$ exiting reactor as a function of time on stream during treatment of an intimate mechanical mixture of materials MNN1 and activated charcoal with about 2000 ppm NO in He gas mixture (total gas flowrate of 60 cc/min). Time t=0 was arbitrarily defined as the start of the NO flow to the reactor.

Thus, 192 mg of MNN1 and 48 mg of activated charcoal were mixed thoroughly so as to produce a visibly well-mixed blend, and all 240 mg of the mixture were loaded into a quartz U-tube reactor and treated with NO as per conditions above. The results of the experiment are represented in FIG. 4. The NO capacity of 253 seconds corresponding to complete uptake of NO from the feed stream by the materials in the reactor means that 1 NO was consumed by 1.3 immobilized nitronyl nitroxide sites in the reactor.

Figure 5:
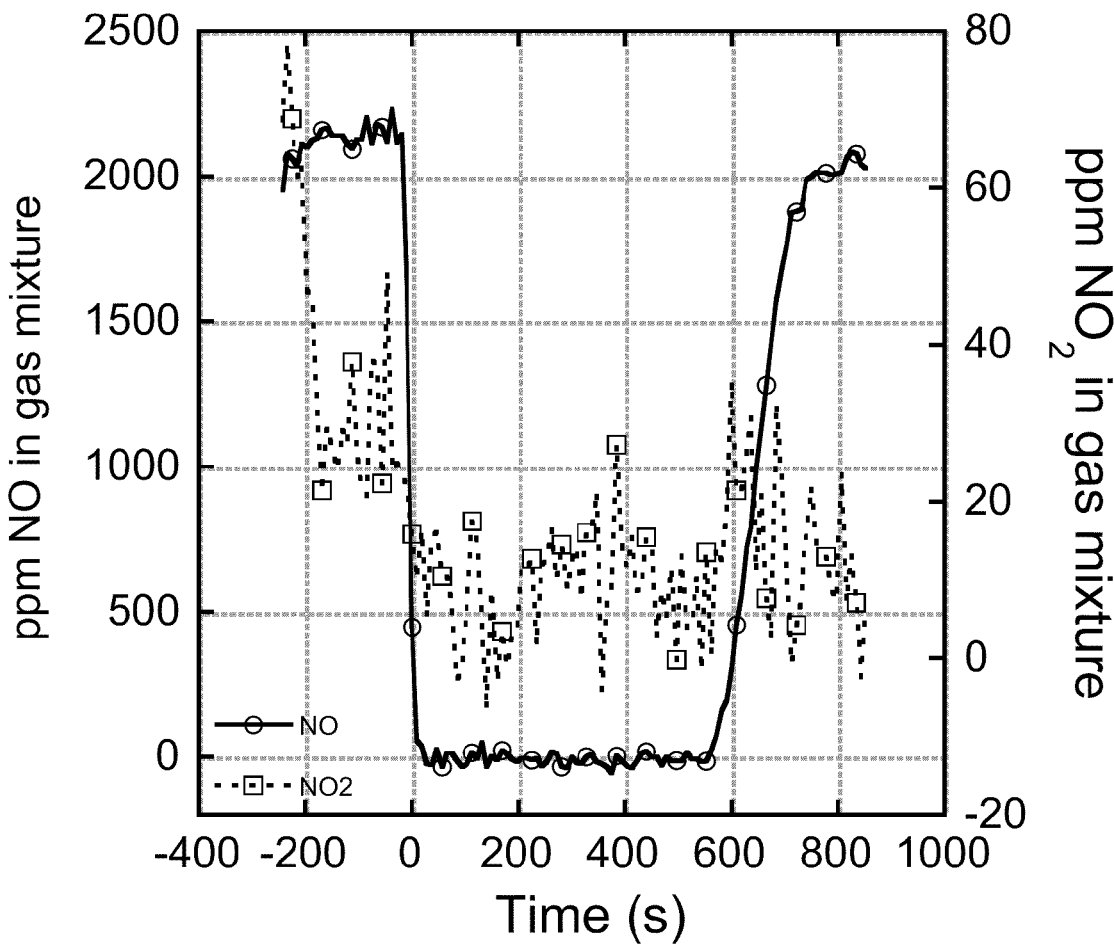
FIG. 5. Amount of NO and $NO_2$ exiting reactor as a function of time on stream during treatment of an intimate mechanical mixture of materials MNN1 and zeolite 5A with about 2000 ppm NO in He gas mixture (total gas flowrate of 60 cc/min). Time t=0 was arbitrarily defined as the start of the NO flow to the reactor.

In an alternate embodiment, material X is chosen to be zeolite 5A. Thus, 319 mg of MNN1 and 81 mg of zeolite 5A were mixed thoroughly so as to produce a well-mixed, blue blend, and all 400 mg of the mixture were loaded into a quartz U-tube reactor and treated with NO as per conditions above. The results of the experiment are represented in FIG. 5. The NO capacity of 562 seconds corresponding to complete uptake of NO from the feed stream by the materials in the reactor meant that 1 NO was consumed by 1.0 immobilized nitronyl nitroxide sites in the reactor. Note that this number is almost exactly, within experimental uncertainty, the predicted value of 1 NO consumed by 1.0 immobilized nitronyl nitroxide sites of Scheme 4, when material X is zeolite 5A. This demonstrates the preferred efficacy of using an $NO_2$ adsorbent such as zeolite 5A as material X.

Considering a typical amount of NO released in tobacco smoke from a cigarette to be 62 µg, it is possible to determine the amount and cost of materials that would be required to remove all of this NO, using the stoichiometries represented by the results of FIGS. 4 and 5. Thus, a mixture of 15 mg of MNN1 and 4 mg of zeolite 5A suffices to remove all NO in tobacco smoke arising from a cigarette. Alternatively, a mixture of 20 mg of MNN1 and 5 mg of activated charcoal suffices to remove all NO in tobacco smoke arising from a cigarette. A crude overestimate of cost assumes specialty chemical pricing from Aldrich Chemical Company on reactants and solvents and ignores the possibility of recycling unspent reactants in a reactor. Even with these drastic oversimplifications, a micromole of immobilized nitronyl nitroxide sites costs 1.3 cents (US). Thus, the total cost to remove NO from a cigarette, including cost of material X, would be 3 cents when using zeolite 5A as material X in the same proportions as in the example above, and it would be 3.5 cents when using activated charcoal as material X in the same proportions as in the example above. These costs are expected to decrease by more than a factor of 20 when reactants are recycled and bulk commodity chemical pricing is used.

An additional advantage is that all components described above, including importantly the nitronyl nitroxide component, are non-toxic and are not listed as carcinogens by ACGIH, IARC, YTP, or Calif. Prop. 65. The low toxicity of nitronyl nitroxide systems is evidenced by their widespread use in rats and mice at the level of 3 mg/mL (see Digestive Diseases and Science, volume 46, p 1805-1818). A 4 mM concentration of nitronyl nitroxide led to only 20% of OL cell death as reported in J. Neuroscience Research, volume 63, p 124-135. Other representative references demonstrating low toxicity of nitronyl nitroxides are WO 03080039; and Jpn J Pharmacol, volume 87, p 51-60.

Example 6

Figure 6:
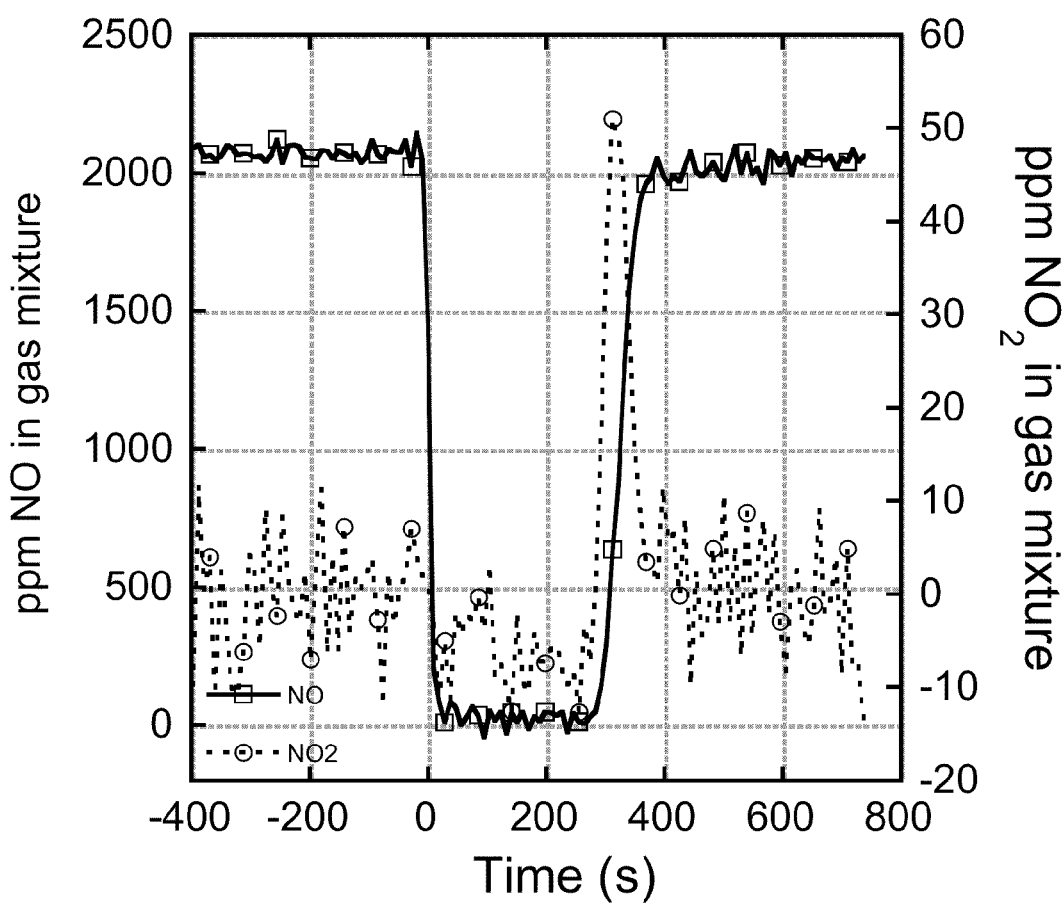
FIG. 6. Amount of NO and $NO_2$ exiting reactor as a function of time on stream during treatment of a mechanical mixture of physisorbed PTIONC on silica and physisorbed TEMPONC on silica with about 2000 ppm NO in He gas mixture (total gas flow rate of 60 cc/min). Time t=0 was arbitrarily defined as the start of the NO flow to the reactor.

Nitronyl nitroxide and nitroxyl radical active sites were immobilized non-covalently on different silica particles via physisorption. This was performed using standard methods of dry loading of chemical species onto a silica support to synthesize two materials, one consisting of physisorbed TEMPONC and the other consisting of physisorbed PTIONC. Thus, 64 mg of TEMPONC (0.41 mmol) was dissolved in 6 mL of dry dichloromethane solvent, to which was added 1.35 g of silica (Selecto 60 Silica Gel). The resulting slurry was stirred briefly so as to make a uniform suspension, and the solvent was removed under reduced pressure. A separate material consisting of physisorbed PTIONC was made by dissolving 91 mg of PTIONC (0.39 mmol) in 6 mL of dry dichloromethane solvent, to which was added 1.40 g of silica (Selecto 60 Silica Gel). The solvent in the resulting blue suspension was evaporated to dryness under reduced pressure, forming a bright blue material. Subsequently, 102 mg of the above TEMPONC physisorbed on silica material was mixed thoroughly with 182 mg of the above PTIONC physisorbed on silica material, so as to produce approximately a 1 to 2 ratio of physisorbed TEMPONC to PTIONC active sites in the resulting mixture. Finally, 284 mg of this mixture were loaded into a quartz U-tube reactor and treated with NO under identical conditions to those described for the examples above. The results of the experiment are presented in FIG. 6. The NO capacity of 290 seconds corresponding to complete uptake of NO from the feed stream by the material in the reactor indicated that 1 NO was consumed by 2 physisorbed nitronyl nitroxide sites and 1 nitroxide site in the reactor of Scheme 3.

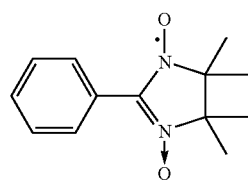

2-phenyl-4,4,5,5-tetramethylimidazoline-3-oxide-1-oxyl
PTIONC

-continued

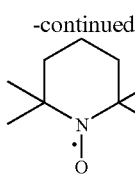

2,2,6,6-tetramethylpiperidinoxy
TEMPONC

Figure 7:
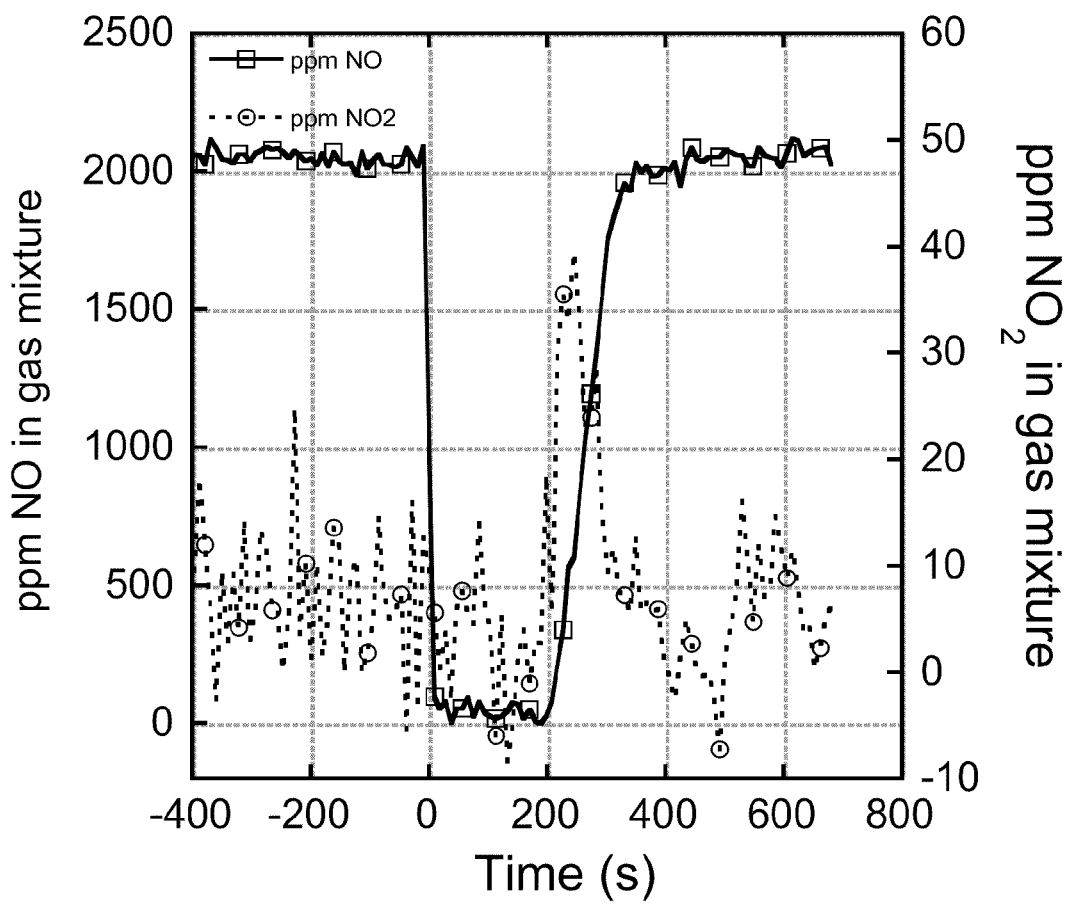
FIG. 7. Amount of NO and $NO_2$ exiting reactor as a function of time on stream during treatment of nitroxyl radical and nitronyl nitroxide sites that are non-covalently physisorbed on the same silica support with about 2000 ppm NO in He gas mixture (total gas flowrate of 60 cc/min). Time t=0 was arbitrarily defined as the start of the NO flow to the reactor.

In this experiment the nitronyl nitroxide active sites, in the form of PTIONC, and nitroxyl radical active sites, in the form of TEMPONC, were non-covalently anchored to the same silica support and used successfully for consuming NOx. This was performed by dissolving PTIONC (0.5 mmol) and TEMPONC (0.25 mmol) together in a solution of dichloromethane (12 mL), adding 3 g of silica support (Selecto 60 Silica Gel), and evaporating the dichloromethane solvent under reduced pressure, causing physisorption of PTIONC and TEMPONC on the same silica surface. Subsequently, 245 mg of the resulting material, consisting of 0.04 mmol of PTIONC and 0.02 mmol of TEMPO, were loaded into a quartz U-tube reactor and treated with NO at the same conditions as in the example above. The expected stoichiometry for this experiment is shown in Figure Z. The results of the NO flow experiment are presented in FIG. 7 with time t=0 corresponding to the start of the experiment and a breakthrough time of larger than 200 seconds corresponding to complete removal of NO from the feed stream by the material. Integration of the NO concentration profile indicates that 1 NO was consumed by 2 physisorbed nitronyl nitroxide sites and 1 nitroxide site in the reactor in accordance with Scheme 3. This demonstrates that nitronyl nitroxide active sites can indeed be used on the same solid support as nitroxyl radical active sites, both types of sites functioning cooperatively and in parallel for adsorbing NOx species.

Example 7

Figure 8:
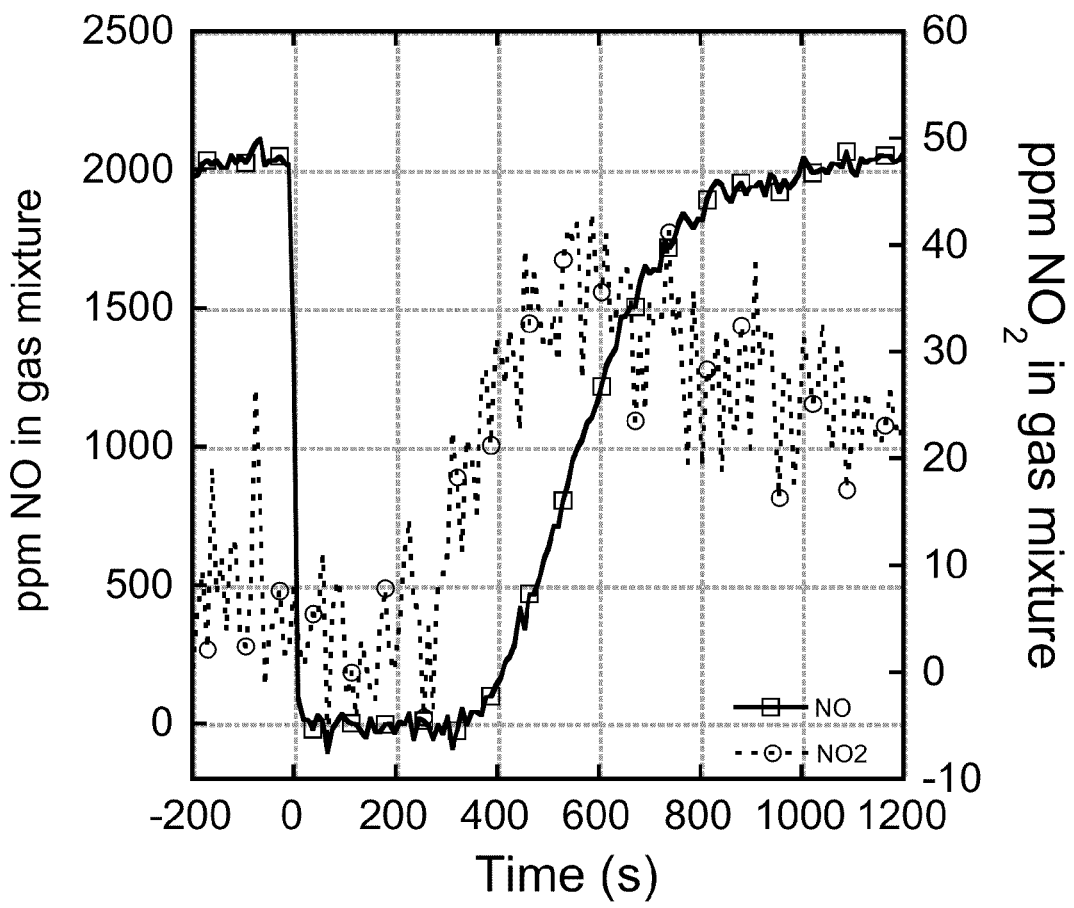
FIG. 8. Amount of NO and $NO_2$ exiting reactor as a function of time on stream during treatment of an mechanical mixture of silica supported physisorbed PTIO and thermally pretreated zeolite 5A with about 2000 ppm NO in He gas mixture (total gas flow rate of 60 mL/min). Time t=0 was arbitrarily defined as the start of the NO flow to the reactor.

Nitronyl nitroxide active sites were non-covalently immobilized on silica via physisorption. This was performed by dry loading PTIONC onto the surface of silica, as described above, such that a final nitronyl nitroxide active site loading of 0.26 mmol/g material was obtained. 200 mg of this material consisting of physisorbed PTIONC on silica was thoroughly mixed with 110 mg of zeolite 5A. The resulting mixture was loaded into a quartz U-tube reactor and treated with NO under identical conditions to those described for the examples above. The results of this experiment are presented in FIG. 8. The integration of the NO concentration demonstrates that approximately 0.95 NO was consumed by 1 physisorbed nitronyl nitroxide site; this is very close to the predicted value of 1 NO consumed by 1 physisorbed nitronyl nitroxide site.

The materials described in the embodiments above, such as an intimate mechanical mixture of immobilized nitronyl nitroxide active sites and zeolite 5A, can be combined with other known inventions in the art for use in cigarettes, including but not limited to within the cigarette filter. For instance, U.S. Pat. No. 7,168,431 demonstrates that the active material for NO removal can be located not only in the filter region of a cigarette, but also along the entire length of the cigarette during smoking. It can also be combined with smoking article wrappers as detailed in U.S. Pat. No. 7,216,652.

Exemplary embodiments of the present invention may be summarized as set forth below.

An NOx adsorption system, comprising: (a) a member selected from an NO oxidation site; and (b) a member selected from an $NO_2$ adsorption site, an $NO_2$ reduction site and combinations thereof wherein at least one of the NO oxidation site, the $NO_2$ adsorption site, the $NO_2$ reduction site and a combination thereof comprises a radical, and x is 1 or 2.

The system according to the paragraph above wherein the NO oxidation site is stoichiometric or catalytic.

The system according to any of the paragraphs above wherein a member selected from the NO oxidation site, the $NO_2$ adsorption site, the $NO_2$ reduction site and a combination thereof is immobilized on a first solid support.

The system according to any of the paragraphs above wherein the NO oxidation site is an oxoammonium nitrite.

The system according to any of the paragraphs above wherein the NO oxidation site is an oxoammonium nitrate.

The system according to any of the paragraphs above wherein the NO oxidation site is a nitronyl nitroxide.

The system according to any of the paragraphs above wherein the nitronyl nitroxide has the formula:

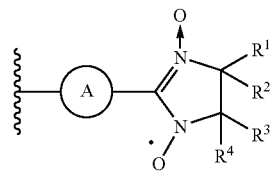

wherein A is selected from aryl and heteroaryl. The bond between A and the solid support may be either covalent, non-covalent, dative, ionic or combinations thereof. $R^1$, $R^2$, $R^3$ and $R^4$ are members selected from substituted or unsubstituted alkyl, substituted or unsubstituted heteroalkyl, substituted or unsubstituted aryl, substituted or unsubstituted heteroaryl and substituted or unsubstituted heteroarylalkyl.

The system according to any of the paragraphs above wherein A is a member selected from substituted or unsubstituted phenyl.

The system according to any of the paragraphs above wherein $R^1$, $R^2$, $R^3$, and $R^4$ are members independently selected from $C_1$-$C_6$ unsubstituted alkyl.

The system according to any of the paragraphs above wherein the nitronyl nitroxide has the formula:

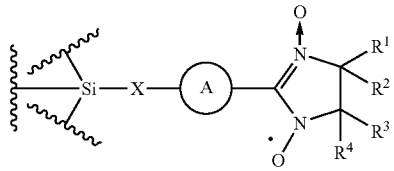

wherein X is a member selected from O, S, amine, amide, carbamate, ester, carbonate, thioester, thiocarbonate, ketone, sulfoxide, sulfone, sulfonate, sulfate, disulfide, phosphine, phosphonate, imine, imide, nitrone, nitroxide, nitroxyl radical, boronate, quaternary ammonium, substituted or unsubstituted alkyl and substituted or unsubstituted heteroalkyl.

The system according to any of the paragraphs above wherein the $NO_2$ adsorption site, the $NO_2$ reduction site and a combination thereof is immobilized on a second solid support.

The system according to any of the paragraphs above wherein the first and the second solid support are different solid supports.

The system according any of the paragraphs above wherein the first and the second solid support are the same solid support.

The system according to any of the paragraphs above wherein the $NO_2$ adsorption site is nitroxide radical.

The system according to any of the paragraphs above wherein the $NO_2$ reduction site is an oxoammonium nitrite.

The system according to any of the paragraphs above wherein the $NO_2$ reduction site is a nitronyl nitroxide.

A device comprising: (a) said system according to any of the paragraphs above; and (b) a container for the system, wherein the container comprises a gas inlet port and a gas outlet port.

A method of oxidizing NO to $NO_2$, the method comprising: contacting NO with a nitronyl nitroxide, wherein said nitronyl nitroxide has the formula:

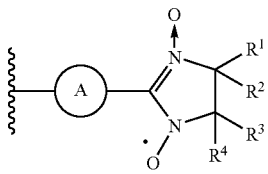

wherein A is selected from aryl and heteroaryl. The bond between A and the solid support may be either covalent, non-covalent, dative, ionic or combinations thereof. $R^1$, $R^2$, $R^3$ and $R^4$ are members selected from substituted or unsubstituted alkyl, substituted or unsubstituted heteroalkyl, substituted or unsubstituted aryl, substituted or unsubstituted heteroaryl and substituted or unsubstituted heteroarylalkyl, under conditions appropriate to oxidize NO to $NO_2$, thereby oxidizing NO to $NO_2$.

The method according to any of the paragraphs above wherein A is a member selected from substituted or unsubstituted phenyl.

The method according to any of the paragraphs above wherein $R^1$, $R^2$, $R^3$, and $R^4$ are members independently selected from $C_1$-$C_6$ unsubstituted alkyl.

The method according to any of the paragraphs above wherein the nitronyl nitroxide has the formula:

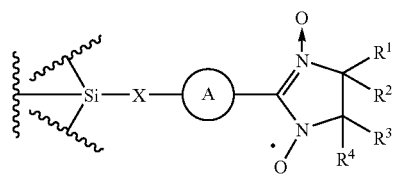

wherein X is a member selected from O, S, amine, amide, carbamate, ester, carbonate, thioester, thiocarbonate, ketone, sulfoxide, sulfone, sulfonate, sulfate, disulfide, phosphine, phosphonate, imine, imide, nitrone, nitroxide, nitroxyl radical, boronate, quaternary ammonium, substituted or unsubstituted alkyl and substituted or unsubstituted heteroalkyl.

The method according to any of the paragraphs above in which the oxidation is performed in a device as set forth above.

REFERENCES

1. Deliconstantinos, G., Villiotou, V., Stavrides, J. C. *Anticancer res.* 1994, 14, 2717-2726.
2. Ma, Z., Huang, Q., Bobbitt, J. M. *J. Org. Chem.* 1993, 58, 4837-4843.
3. Kaupp, G., Schmeyers, J. *J. Org. Chem.* 1995, 60, 5494-5503.
4. Chou, S., Nelson, J. A., Spencer, T. A. *J. Org. Chem.* 1974, 39, 2356-2361.
5. (a) Great Britain Patent 1592157 (published 1 Jul. 1981).
   (b) United States Patent 2003/0106562 A1 (published 12 Jun. 2003).
6. Goldstein, S., Russo, A., Samuni, A. *The Journal of Biological Chemistry* 2003, 278, 50949-50955.
7. Nadeau, J. S., Boocock, D. G. B. *Anal. Chem.* 1977, 49, 1672-1676.
8. Goldstein, S., Samuni, A., Russo, A. *J. Am. Chem. Soc.* 2003, 125, 8364-8370.
9. Hirel, C., Vostrikova, K. E., Pecaut, J., Ovcharenko, V. I. *Chem. Eur. J.* 2001, 7, 2007-2014.
10. Wu, Y., Bi, L., Bi, W., Li., Z., Zhao, M., Wang, C., Ju, J., Peng, S. *Bioorg. Med. Chem.* 2006, 14, 5711-5720.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. An NOx adsorption system, comprising:
   (a) a NO oxidation site having a nitronyl nitroxide site, said NO oxidation site immobilized on a first solid support; and
   (b) a $NO_2$ adsorption site immobilized on a second solid support,
   wherein at least one of said NO oxidation site and said $NO_2$ adsorption site comprises a radical, and x is 1 or 2, wherein the NO oxidation site and $NO_2$ adsorption site are configured such that said $NO_2$ adsorption site adsorbs $NO_2$ generated by the NO oxidation site, and wherein said first and second solid supports are not activated charcoal.

2. The system according to claim 1, wherein said first and said second solid support are different solid supports.

3. The system according to claim 1, wherein said first and said second solid support are the same solid support.

4. The system according to claim 1, wherein said $NO_2$ adsorption site is a nitroxide radical.

5. A device comprising:
   (a) said system according to claim 1; and
   (b) a container for said system, wherein said container comprises a gas inlet port and a gas outlet port.

6. The system according to claim 1, wherein said first solid support is a silica support.

7. The system according to claim 1, wherein said second solid support is a silica support.

8. The system according to claim 1, wherein said NO oxidation site is covalently attached to the first solid support, wherein the first solid support is a silica support.

9. The system according to claim 1, wherein said NO oxidation site is noncovalently attached to the first solid support.

10. The system according to claim 8, wherein said $NO_2$ adsorption site is covalently attached to the second solid support, wherein the second solid support is a silica support.

11. The system according to claim 1, wherein said $NO_2$ adsorption site is noncovalently attached to the second solid support.

12. The system according to claim 1, wherein said nitronyl nitroxide has the formula:

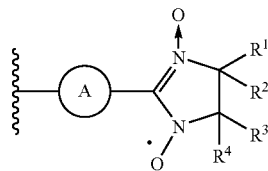

wherein
A is selected from aryl and heteroaryl;
the bond between A and the first solid support is a member selected from covalent, non-covalent, dative, ionic and a combination thereof; and
R1, R2, R3 and R4 are members independently selected from substituted or unsubstituted alkyl, substituted or unsubstituted heteroalkyl, substituted or unsubstituted aryl, substituted or unsubstituted heteroaryl and substituted or unsubstituted heteroarylalkyl.

13. The system according to claim 12, wherein A is substituted or unsubstituted phenyl.

14. The system according to claim 12, wherein $R^1$, $R^2$, $R^3$, and $R^4$ are members independently selected from $C_1$-$C_6$ unsubstituted alkyl.

15. An NOx adsorption system, comprising:
   (a) a NO oxidation site having a nitronyl nitroxide site, said NO oxidation site immobilized on a first solid support, wherein said nitronyl nitroxide has the formula:

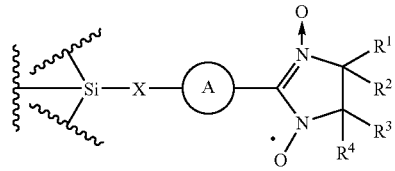

wherein
X is a member selected from O, S, amine, amide, carbamate, ester, carbonate, thioester, thiocarbonate, ketone, sulfoxide, sulfone, sulfonate, sulfate, disulfide, phosphine, phosphonate, imine, imide, nitrone, nitroxide, nitroxyl radical, boronate, quaternary ammonium, substituted or unsubstituted alkyl and substituted or unsubstituted heteroalkyl;
A is selected from aryl and heteroaryl;
$R^1$, $R^2$, $R^3$ and $R^4$ are members independently selected from substituted or unsubstituted alkyl, substituted or unsubstituted heteroalkyl, substituted or unsubstituted aryl, substituted or unsubstituted heteroaryl and substituted or unsubstituted heteroarylalkyl; and
   (b) a $NO_2$ adsorption site immobilized on a second solid support,
wherein at least one of said NO oxidation site and said $NO_2$ adsorption site comprises a radical, and x is 1 or 2, wherein said $NO_2$ adsorption site adsorbs $NO_2$ generated by the NO oxidation site, and wherein said first and second solid supports do not comprise activated charcoal.

16. The system according to claim 14, wherein said first and said second solid supports are different solid supports.

17. The system according to claim 14, wherein said first and said second solid support are the same solid support.

18. The system according to claim 14, wherein said $NO_2$ adsorption site is nitroxide radical.

19. The system according to claim 1, wherein said $NO_2$ adsorption site is not a nitronyl nitroxide.

* * * * *